US007137883B1

(12) United States Patent
Falciglia, Sr.

(10) Patent No.: US 7,137,883 B1
(45) Date of Patent: Nov. 21, 2006

(54) METHOD AND SYSTEM FOR PLAYING A POKER MATRIX GAME

(76) Inventor: Sal Falciglia, Sr., 386 Highview Ter., Ridgewood, NJ (US) 07450

( * ) Notice: Subject to any disclaimer, the term of this patent is extended or adjusted under 35 U.S.C. 154(b) by 0 days.

(21) Appl. No.: 11/226,732

(22) Filed: Sep. 14, 2005

Related U.S. Application Data

(60) Provisional application No. 60/682,995, filed on May 20, 2005.

(51) Int. Cl.
*A63F 1/00* (2006.01)
*A63F 13/00* (2006.01)
*G07F 17/34* (2006.01)

(52) U.S. Cl. ............................ 463/13; 463/20; 463/25; 273/292; 273/143 R; 273/138.2

(58) Field of Classification Search ............ 273/143 R; 463/12, 13, 2

See application file for complete search history.

(56) References Cited

U.S. PATENT DOCUMENTS 5,971,849 A * 10/1999 Falciglia ...................... 463/16
6,220,959 B1 * 4/2001 Holmes et al. ............... 463/13
6,346,043 B1 * 2/2002 Colin et al. .................... 463/17
6,443,456 B1 9/2002 Gajor
2002/0025846 A1 * 2/2002 Bennett et al. ............... 463/20
2003/0130024 A1 * 7/2003 Darby ......................... 463/13

FOREIGN PATENT DOCUMENTS

GB 2216322 A * 10/1989

* cited by examiner

*Primary Examiner*—Benjamin Layno
(74) *Attorney, Agent, or Firm*—Carter DeLuca Farrell & Schmidt, LLP

(57) ABSTRACT

A method and system for playing a poker matrix game is described. The game is configured for playing via a casino-type gaming machine in which a player selects at least one betting line, such as, for example horizontal, vertical, and/or diagonal betting lines, to place a wager on. The player activates the spinners causing a random matrix of cards to be displayed. The random cards are evaluated for determining if the at least one selected betting line includes a winning poker hand.

20 Claims, 32 Drawing Sheets

METHOD AND SYSTEM FOR PLAYING A POKER MATRIX GAME

PRIORITY

The present disclosure is a U.S. patent application claiming priority from a U.S. Provisional Application filed on May 20, 2005 entitled: "METHOD AND SYSTEM FOR PLAYING A POKER MATRIX GAME" and assigned U.S. Patent Application Ser. No. 60/682,995, the entire contents of which are incorporated herein by reference.

BACKGROUND

1. Technical Field

The present disclosure relates generally to games. In particular, the present disclosure relates to a method and system for playing a poker matrix game.

2. Description of the Prior Art

The gaming industry has come to recognize that to sustain long term success it must be constantly innovative in introducing new games and new gambling concepts to the gaming public. One example of this innovating drive can be appreciated with the embrace of the Internet and online gambling by the gaming industry. Presently, most games found in casinos, both brick-and-mortar and online, have centered on the traditional games associated with the gaming industry, i.e. Poker, Black Jack, etc.

The game of poker has for many years been a popular game to play for recreation and for gambling. The new market for the gaming industry in general is the group of individuals who find the traditional game of poker to be complex and exciting. In the drive to attract greater numbers of players, casinos strive to include games that are familiar, simple to understand, engaging, and entertaining.

SUMMARY

The present disclosure describes a method and system for playing a poker matrix game having a main game and a bonus game. In one embodiment, the poker matrix game is configured for playing via a casino-type gaming machine in which a player selects at least one betting line, such as, for example horizontal, vertical, and/or diagonal betting lines, of a matrix to place a wager on for playing the main game. The player then initiates a random matrix of cards from a 54-card deck to be displayed by the matrix. The random cards are evaluated for winning poker hand(s) and winnings are awarded to the player if the winning poker hand(s) are displayed by the at least one betting line.

The different winning poker hands are defined in a pay table. The 54-card deck includes a standard deck and two wild cards (a Joker card and a Super Joker card). A Free Spin option is also included which when displayed in the form of a Free Spin icon, the player is awarded a free spin or turn which is played immediately following the current game play in which the free spin or turn was awarded.

In an alternative embodiment, the Free Spin option is replaced with a Free Spin card and the two wild cards are replaced with one wild card. In this embodiment, when the Free Spin card is displayed it momentarily overlays a portion of another card of the standard deck which is displayed by the matrix, before disappearing and revealing the hidden card.

The poker matrix game is programmed as a set of programmable instructions capable of being executed by at least one processor of a gaming system, such as, for example, a casino gaming machine, for enabling play of the game. The gaming system includes a display for displaying a graphical user interface having a 5×5 matrix made up by five vertical reels. The vertical reels are graphical representations of five mechanical reels which during game play simulate a spinning action. After the "reels" stop spinning during each game play of the main game, each vertical reel can display up to five cards from the 54-card standard deck, as well as the Joker, Super Joker and Free Spin cards.

The display also displays electronic touch-screen buttons or icons for placing bets that at least one given betting line of the 5×5 matrix will have a winning poker hand. The betting lines include 5 horizontal betting lines, 5 vertical betting lines, and 2 diagonal betting lines. The bets can also be placed by using buttons or other input devices provided on a console of the gaming system. A player can bet up to a predetermined number of credits, e.g., 20 credits, per betting line. The player accumulate winnings, i.e. credits, if a predetermined poker hand is obtained on the betting lines which were bet—the better the poker hand obtained, the more credits are earned.

According to the poker matrix game of the present disclosure, the player can also accumulate credits by playing the bonus game of the poker matrix game. The bonus game is initiated if a predetermined set of cards is displayed during play of the main game on a given betting line of the 5×5 matrix or other predetermined condition is met during play of the main game.

During game play of the main game, at least one processor processes the displayed matrix and determines whether the player received a Joker card, i.e. a wild card and/or Super Joker card. If the player received a Joker card on a betting line and a bet was placed on that betting line, the at least one processor completes the best poker hand(s) available in each applicable poker hand and multiplies the winning betting line or betting lines by two.

If the player received a Super Joker card on a betting line and a bet was placed on that betting line, then the card acts as a wild card. The at least one processor completes the best poker hand(s) available in each applicable poker hand and multiples the winning betting line or betting lines by four. If the player received both a Joker card and a Super Joker card on the same betting line and a bet was placed on that betting line, the winning betting line or betting lines are multiplied by eight.

In an alternate embodiment of the present disclosure, game play is conducted over the Internet or other suitable network, wherein the player interacts with the remote server or other computing device via a personal computer or other device capable of establishing a network connection with the remote server.

Another alternate embodiment of the disclosure provides for incorporating the game in a slot or other gaming machine with game play occurring within a casino or other establishment. In this embodiment, game play is initiated by the player inserting a predetermined number of tokens, swiping a prepaid card, or effecting payment by other means.

Another embodiment provides play of the main game via a pre-printed lottery card having a plurality of concealed cells forming a matrix of cells. One can scratch off the material concealing the cells to reveal icons and to determine if any lines of the matrix reveal a predetermined poker hand.

BRIEF DESCRIPTION OF THE DRAWINGS

The foregoing features of the present disclosure will become more readily apparent and will be better understood by referring to the following detailed description of embodiments, which are described hereinbelow with reference to the drawings wherein.

DETAILED DESCRIPTION

Figure 1:
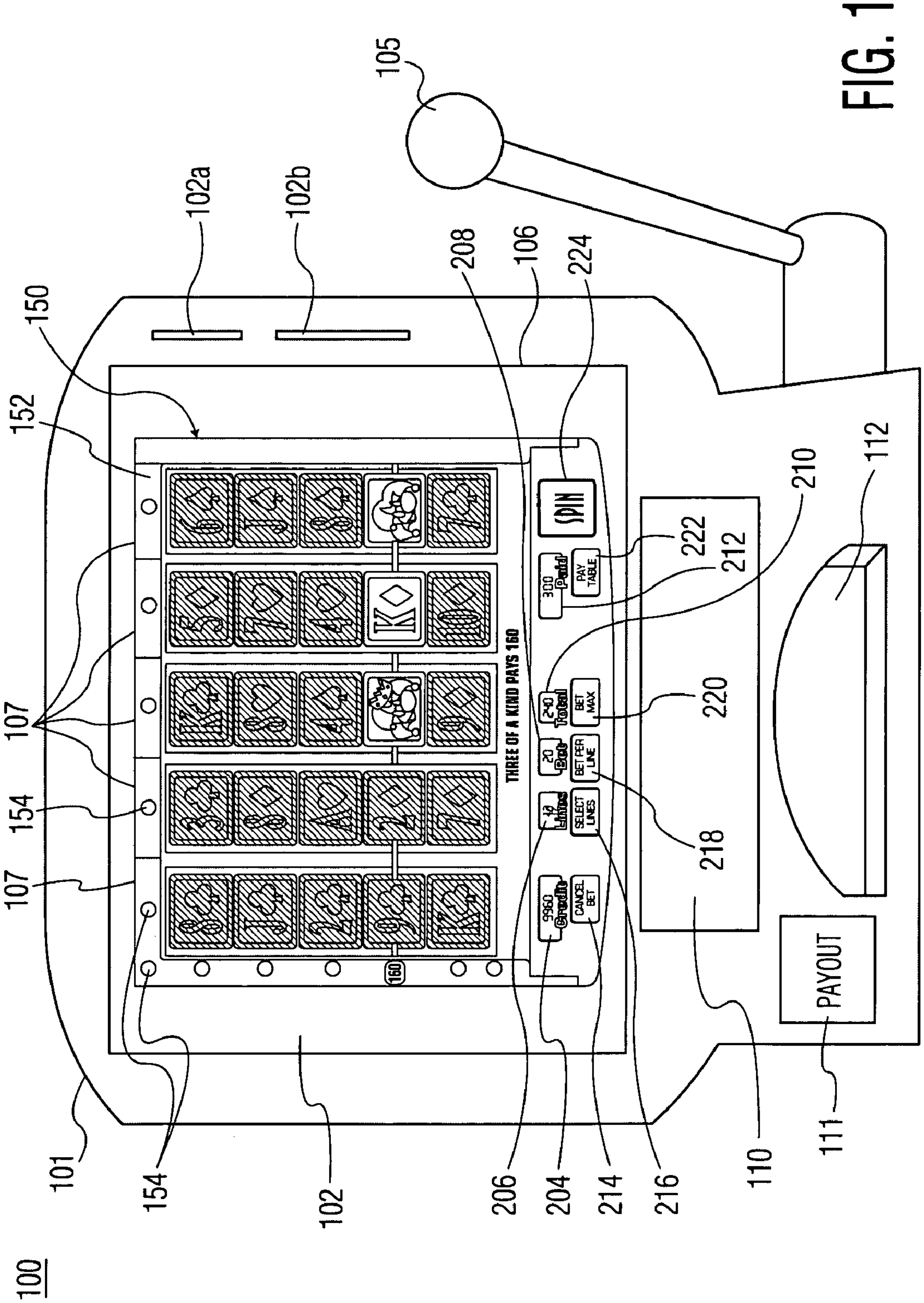
FIG. 1 is a schematic illustration of a casino-type gaming machine for playing the poker game matrix in accordance with the present disclosure.

Referring now in detail to the drawing figures, in which like references numerals identify similar or identical elements, the present disclosure describes a method and system for playing a poker matrix game having a main game and a bonus game. The main game is played with a 54-card deck which includes a standard deck and two wild cards (a Joker card and a Super Joker card). A Free Spin option is also included which when displayed in the form of a Free Spin icon awards the player a free spin or free turn which is played immediately following the current game play in which the free spin or turn was awarded.

In an alternate embodiment, the Free Spin option is replaced with a Free Spin card and the two wild cards are replaced by one wild card. In this embodiment, when the Free Spin card is displayed it momentarily overlays at least a portion of another card of the standard deck, before disappearing and revealing the hidden card. It is envisioned that more than one standard deck can be utilized, as well as more than one Joker card, Super Joker card and Free Spin card.

The game is programmed as a set of programmable instructions or other format for execution by at least one processor embedded within a gaming system, such as, for example, a casino-type gaming machine, for enabling play of the game.

A schematic illustration of a casino-type gaming machine having a touch screen and buttons for receiving player inputs and configured for receiving and awarding money is shown by FIG. 1 and designated by reference numeral 100. Other computing devices for playing the game are envisioned, such as a PDA, personal computer, cellular telephone, etc.

Specifically, the poker matrix game described herein can be formatted/designed for play by at least one player (e.g. one player or multi-player) using a set of programmable instructions stored on computer-readable media, such as magnetic, optical, opto-magnetic, electronic, etc., and capable of being executed by at least one processor for individual play (one player) or multiple play (multiple players) utilizing:

- stand-alone computing devices (casino machines, game consoles, computers, kiosks, etc.) to access the set of programmable instructions stored on the device or electronically access a playable version of the game via the internet or other local-area-networks (LAN) or wide-area-networks (WAN);
- handheld computing devices both hard wired or wireless (PDA's, cell phones, media players, etc.) to access the set of programmable instructions stored on the device or electronically access a the set of programmable instructions of the game via the internet, or other local-area-networks (LAN), or wide-area-networks (WAN); and
- interactive TV devices (set-top boxes, etc.) to access the set of programmable instructions over a closed network (cable, satellite, etc.) or broadcast TV networks (including live TV game shows).

However, play of the poker matrix game is described herein with reference to the various figures as being played using the casino-type gaming machine 100 shown by FIG. 1. The casino-type gaming machine 100 includes a touch-screen display unit 102 for displaying a graphical user interface 150 and for enabling a user to interact with the machine 100 during play of the game. The graphical user interface 150 includes a 5×5 matrix 152 made up of five vertical reels 107.

The vertical reels 107 are graphical representations of five mechanical reels which during game play simulate a spinning action. After the "reels" stop spinning during each game play of the main game, each vertical reel 107 can display up to five cards from the 52-card standard deck, as well as the Joker, Super Joker and Free Spin cards.

The graphical user interface 150 further includes a plurality of virtual buttons 214, 216, 218, 220 and 222 for selecting at least one betting line of the 5×5 matrix 152 and performing other functions as described below. Each betting line also includes a corresponding virtual button 154 for selecting that particular betting line.

The graphical user interface 150 further includes a virtual button labeled SPIN 224 for initiating spinning of the vertical reels 107. The vertical reels 107 can also be spun by pulling arm 105. A PAYOUT button 111 is included in proximity to a bin 112 for cashing out the player's winnings. The winnings can be stored on a prepaid gaming card inserted within slot 102*a* or dispensed to bin 112 when the PAYOUT button 111 is touched. Additional buttons are provided in area 110 on the front face of the gaming machine 100 for playing the game and performing other functions without touching virtual buttons displayed by the graphical user interface 150.

The graphical user interface 150 further includes display windows 204, 206, 208, 210 and 212 for displaying credits attributed to or earned by the player during game play and other information as described below. The gaming machine 100 further includes a slot 102*b* for inserting money, tokens, etc. into the machine 100 which are translated into available credits for playing the game. The available credits can be redeemed for prizes, money, credit, etc. as known in the art.

The objective of the poker matrix game in accordance with the present disclosure is to (1) accumulate winnings (credits) during play of the main game by obtaining poker hands on selected betting lines—the better the poker hand obtained, the more credits are earned; and (2) accumulate extra winnings in the bonus game. The bonus game is automatically initiated when the graphical user interface 150 displays a set of predetermined cards on a selected betting line of the 5×5 matrix 152 or some other predetermined condition is met.

A method for playing the main game of the poker matrix game will now be described followed by a description of progressive game play with reference to FIGS. 2A–2H.

1. Using virtual buttons displayed by a graphical user interface, a player selects at least one betting line displayed by the 5×5 matrix. The user then indicates the amount bet per each selected betting line. The player may choose to place a bet for at least one diagonal betting line, at least one horizontal betting line and/or at least one vertical betting line. The overall objective of the main game is to select and place bets on one or more betting lines that will display winning poker hands according to a predefined poker pay table as shown in Table 1 hereinbelow. If the player is satisfied with his bet(s), he can touch a SPIN button to cause cards to be randomly selected from the 54-card deck and be displayed on the 5×5 matrix. If the player is not satisfied with his bet(s), he can select a CANCEL BET button to cancel his bets. In order to be able to touch the SPIN button, the player must have selected and placed a bet for at least one betting line. All betting lines not selected for placing bets by the player are greyed out or highlighted in some other manner to indicate that these betting lines were not selected.
2. After the SPIN button is touched, the matrix displays cards in each vertical reel which are randomly selected from the 54-card deck (the Free Spin icon could also be displayed in the matrix if the embodiment with the Free Spin option is being played).
3. Prior to the SPIN button being touched, at least one processor of the gaming machine determines whether a Free Spin icon or a randomly selected wild card will appear in the matrix.
4. A Free Spin gives the player an additional spin or turn with exactly the same betting lines which were selected and played for the spin which awarded the player the free spin. The same bet amounts for each selected betting line are also used. The Free Spin icon will appear approximately about 1 out of every 10 spins. If the at least one processor determines a Free Spin option, then a Free Spin icon may appear anywhere on the matrix, including on the non-selected betting lines.

In the embodiment described below with reference to FIGS. 2A–2H, the Free Spin icon appears momentarily on one of the squares or cells of the matrix overlaying a card from the 54-card deck. The Free Spin icon then disappears to reveal the hidden card from the 54-card deck. A Free Spin icon is displayed by the graphical user interface to notify the player that he has been awarded a free spin. The icon is displayed until the Free Spin is used.

5. If the player receives a wild card in one of the cells of the matrix, as pre-determined by the at least one processor (see step three above), then the following occurs:

If the wild card is a Joker card, the at least one processor selects a card not displayed by the matrix which would form a poker hand, i.e. the at least one processor completes the best poker hand available in each applicable poker hand, and doubles the payout amount by multiplying the winning betting line or betting lines by two.

If the wild card is a Super Joker card, the at least one processor selects a card not displayed by the matrix which would form a poker hand in a similar manner as described above for the Joker card. After selecting a card to form a poker hand, the at least one processor then multiplies the winning betting line or betting lines by four.

In both instances (appearance of a Joker and/or Super Joker cards), if there is no remaining card that could form a poker hand, i.e., all cards which could have formed a poker hand are displayed, the at least one processor indicates this to the player by displaying a message on the graphical user interface.

Alternatively, the Super Joker card can also be used for allowing the player to replace any one card on the matrix by receiving another random card from the 54-card deck that is not displayed by the matrix in order to form a poker hand.

The Super Joker card is displayed approximately 1 out of every 25 spins or turns.

If the player receives both a Joker card and a Super Joker card on the same pay or betting line and a bet has been placed on that pay or betting line, the at least one processor multiplies the winning line or lines by eight.

6. The at least one processor finally evaluates the selected betting lines to determine any winning poker hands displayed by the selected betting lines.
7. Any winning poker hands on the selected betting lines are highlighted and credits are awarded based upon a predetermined poker pay table. Table 1 hereinbelow illustrates a sample poker pay table. The pay table may be displayed by the graphical user interface if the player selects a PAY TABLE virtual button as shown by FIGS. 2A–2H.
8. The player's credits are then updated accordingly and displayed by a CREDIT window of the graphical user interface.

TABLE 1

| | | | |
|---|---|---|---|
| Three-of-a-Kind | Pays | 1 | Credit |
| Straight | Pays | 5 | Credits |
| Flush | Pays | 7 | Credits |
| Full House | Pays | 9 | Credits |
| Four-of-a-Kind | Pays | 11 | Credits |
| Straight Flush | Pays | 50 | Credits |
| Five-of-a-Kind | Pays | 80 | Credits |
| Wild Royal Flush (Royal Flush with one or two wild cards) | Pays | 120 | Credits |
| Natural Royal Flush (Royal Flush with no wild cards) | Pays | 10,000 | Credits |

Main Game

The main game of the poker matrix game of the present disclosure will now be described in more detail with reference to FIGS. 2A–2H. In these figures, the embodiment with the Free Spin card is illustrated. Nonetheless, the main game of the poker matrix game is played the same way regardless of which graphical user interface is displayed by the display unit 101.

Figure 2A:
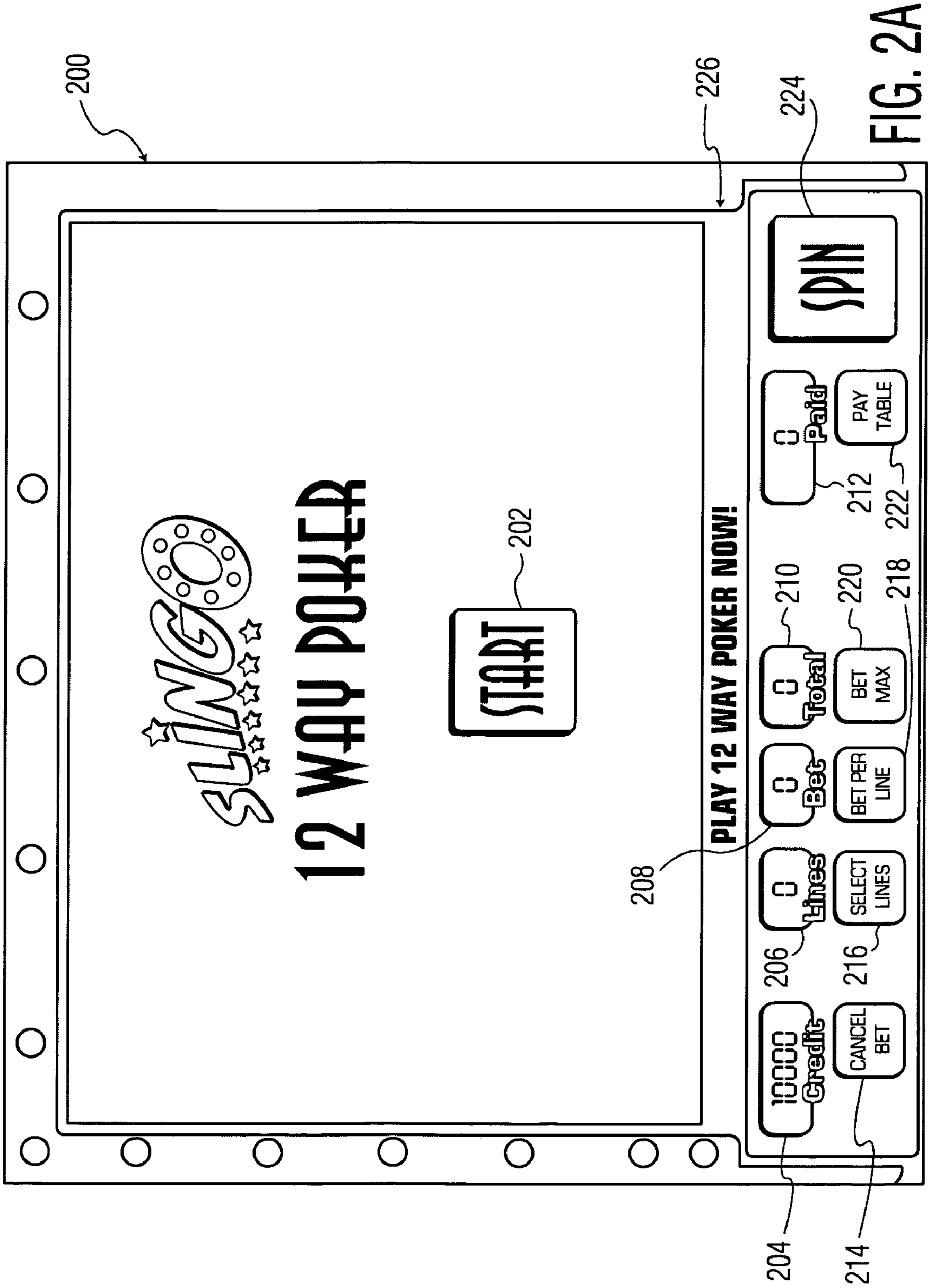
FIGS. 2A–2H illustrate progressive screen views showing game play of the main game of the poker matrix game in accordance with the present disclosure.

FIG. 2A illustrates a screen view of the graphical user interface 200 prior to initiation of the main game of the poker matrix game. The graphical user interface 200 includes a START virtual button 202 which can be touched after the player inserts a prepaid game card or money within a gaming machine having a display unit displaying the graphical user interface 200.

The graphical user interface 200 further includes a CREDIT window 204 for indicating how many credits the player has; a LINES window 206 for indicating how many betting lines were selected for placing a bet; a BET window 208 for indicating the amount of credits bet for each selected betting line; a TOTAL window 210 for indicating the total amount of credits bet; and a PAID window 212 for indicating the amount of winning awarded to the player.

The graphical user interface 200 further includes the following virtual buttons which are activated by touching: a CANCEL BET button 214 for canceling a bet; a SELECT LINES button 216 for selecting the number of betting lines to bet; a BET PER LINE button 218 for selecting the amount of credits to be bet for each selected betting line; a BET MAX button 220 for selecting the maximum bet allowable; a PAY TABLE button 222 for touching to view a pay table, such as Table 1 above; and a SPIN button 224 for activating game play following the selection of at least one betting line and placement of a bet.

The betting lines can also be selected by touching a virtual button 225 (see FIG. 2B) alongside each betting line. These virtual buttons appear after the START button 202 is touched and are replaced by windows 225' (see FIG. 2B). Windows 225' indicate the amount of credits awarded for the corresponding betting line following a determination that the betting line displays a winning poker hand.

A message line 226 is also provided by the graphical user interface 200 for displaying messages to the player, such as "PLAY 12 WAY POKER NOW!" as shown by FIG. 2A. Prior to initiating game play the CREDIT window 204 indicates that the player has 10000 available credits.

Figure 2B:
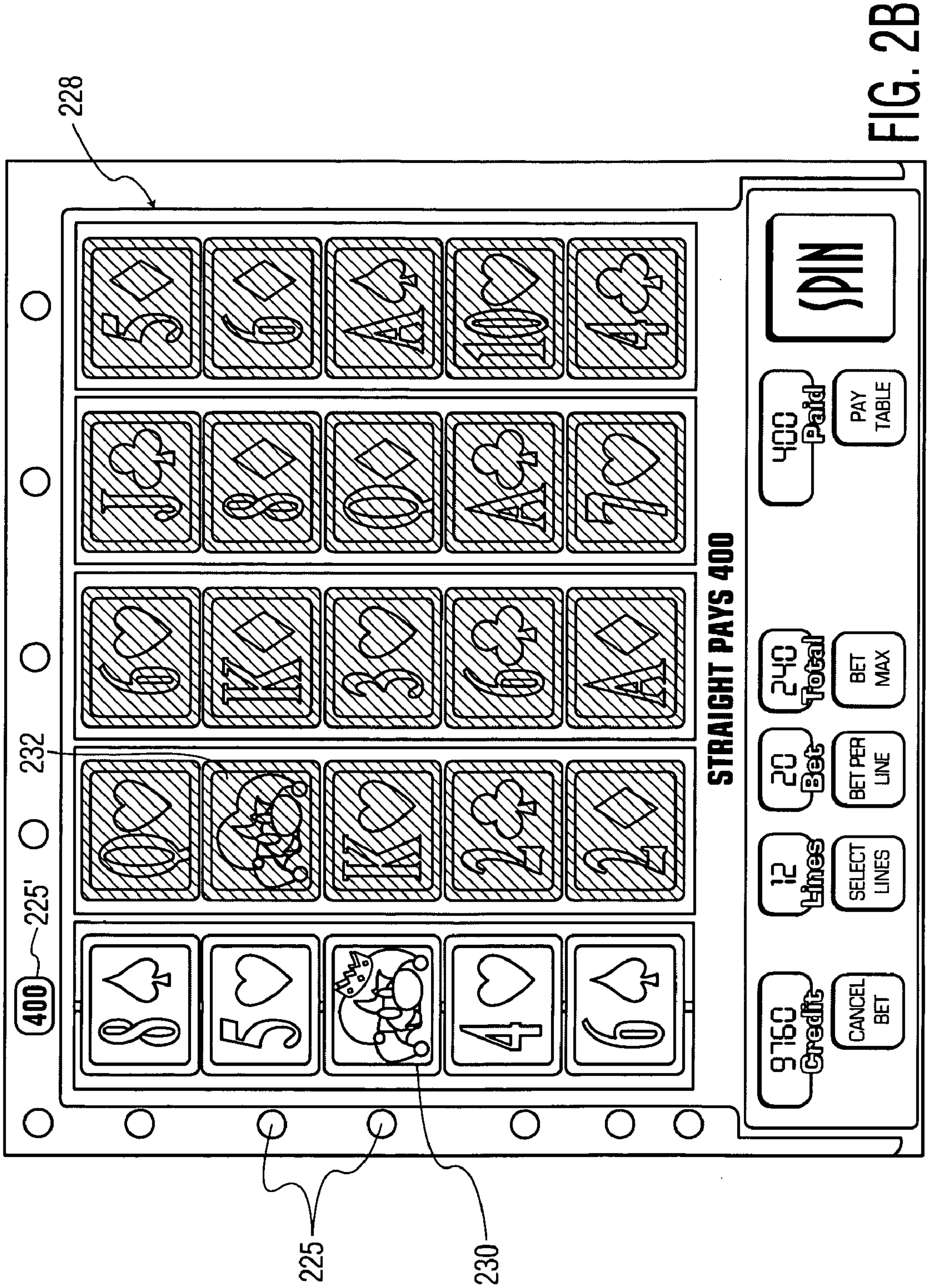

With reference to FIG. 2B, prior to touching the SPIN button 224, the player selects all 12 betting lines as indicated by LINES window 206. The player bets 20 credits per betting line as indicated by BET window 208 for a total of 240 credits bet as indicated by TOTAL window 210. Hence, the total number of available credits is 9760.

After selecting to play all 12 betting lines and placing a bet for each betting line, the player touches the SPIN button 224 and cards are displayed by a matrix 228 of the graphical user interface 200. The cards include 23 cards from a standard deck, the Super Joker card 230 and the Joker card 232. The at least one processor then determines that the best poker hand that can be obtained by the leftmost vertical reels is a straight if the Super Joker substitutes for a seven (i.e., the Super Joker is replaced with a seven).

The at least one processor then substitutes the Super Joker with a seven. The at least one processor selects either the seven of diamonds, seven of spades or seven of clubs; the seven of hearts cannot be selected because it is already displayed by the matrix 228. The at least one processor then awards the player 400 credits for the straight and the message line 226 displays "STRAIGHT PAYS 400." The 400 credits are computed by the at least one processor as follows using the pay table shown by Table 1: 20 credits bet per betting line times five credits (see pay table) times four (multiplier for the Super Joker) equals 400 credits. Hence, the PAID window 212 displays 400.

Figure 2C:
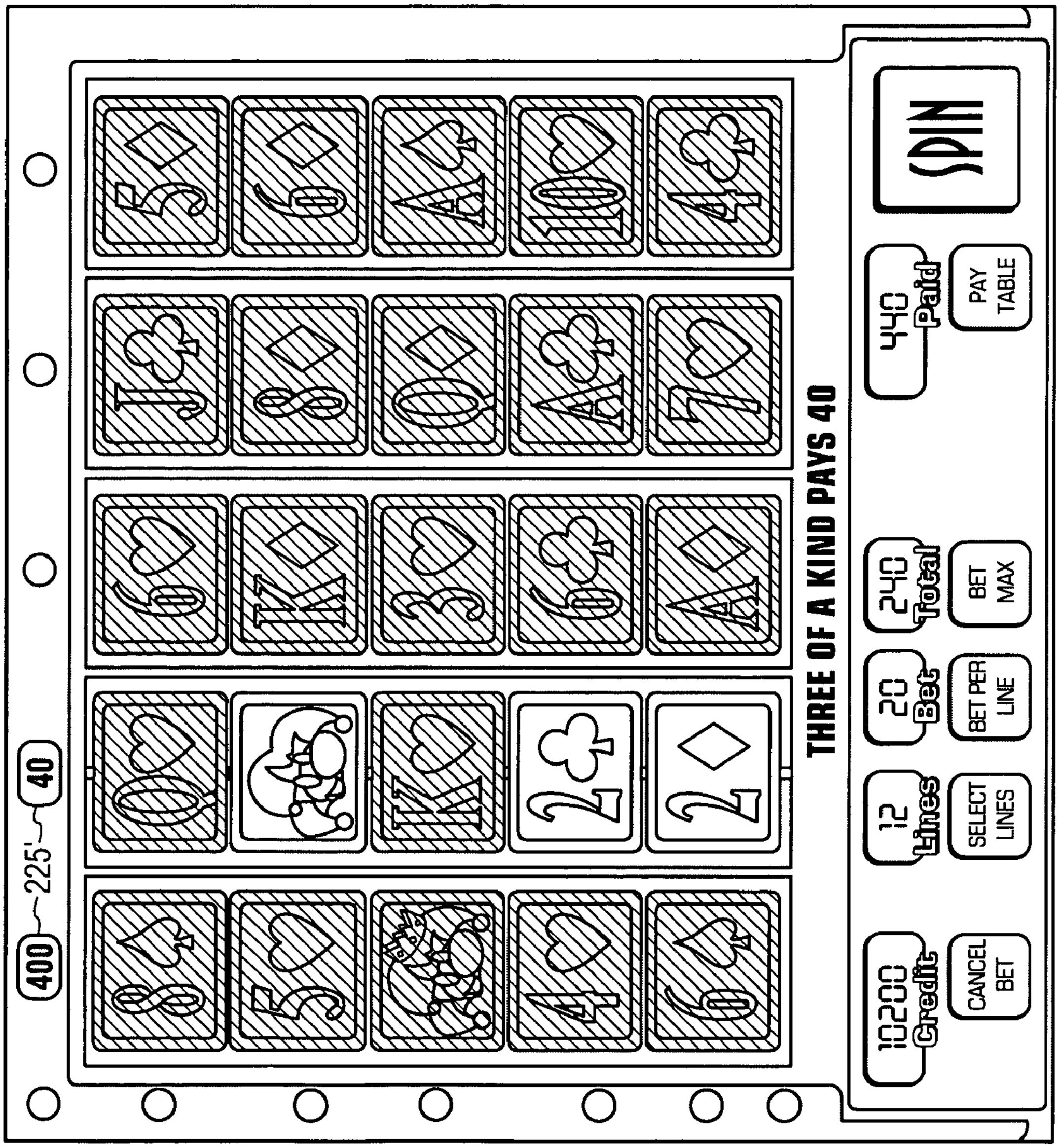

During the same spin, with reference to FIG. 2C, the player obtains a three-of-a-kind in the vertical reels adjacent the leftmost vertical reels. In this case, the at least one processor substitutes a two of hearts or spades for the Joker to obtain the three-of-a-kind as indicated by the message line 226. The at least one processor then awards the player 40 credits for the three-of-a-kind. The 40 credits are computed by the at least one processor as follows using the pay table shown by Table 1: 20 credits bet per betting line times one credit (see pay table) times two (multiplier for the Joker) equals 40 credits. Hence, the paid window 212 displays 440 credits for the entire spin and the CREDIT window 204 displays 10200 available credits (9760 plus 440 equals 10200).

Figure 2D:
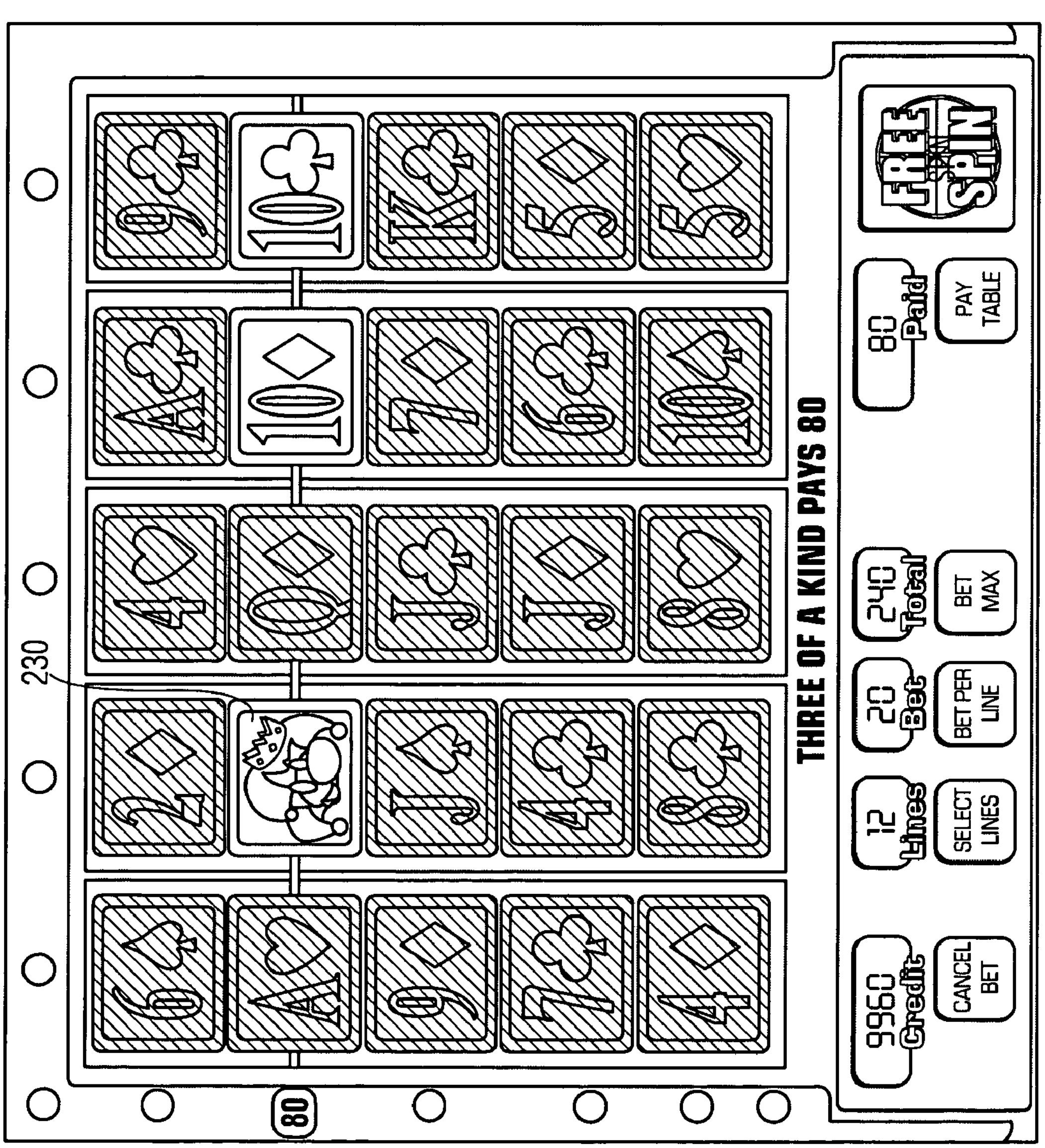

Prior to touching the SPIN button 224 again, the player selects all 12 betting lines again as indicated by LINES window 206 in FIG. 2D. The player bets 20 credits per betting line as indicated by BET window 208 for a total of 240 credits bet as indicated by TOTAL window 210. Hence, the total number of available credits is 9960.

After selecting to play all 12 betting lines and placing a bet for each betting line, the player touches the SPIN button 224 and cards are displayed by the matrix 228 of the graphical user interface 200. The cards include 24 cards from a standard deck and the Super Joker card 230. The at least one processor then determines that the best poker hand that can be obtained by the vertical reels adjacent the leftmost vertical reels is a three-of-a-kind if the Super Joker substitutes for a ten.

The at least one processor then substitutes a ten for the Super Joker. The at least one processor selects the ten of hearts; the tens for the other suits cannot be selected because they are already displayed by the matrix 228. The at least one processor then awards the player 80 credits for the three-of-a-kind and the message line 226 displays "THREE OF A KIND PAYS 80." The 80 credits are computed by the at least one processor as follows using the pay table shown by Table 1: 20 credits bet per betting line times one credit (see pay table) times four (multiplier for the Super Joker) equals 80 credits. Hence, the PAID window 212 displays 80.

Figure 2E:
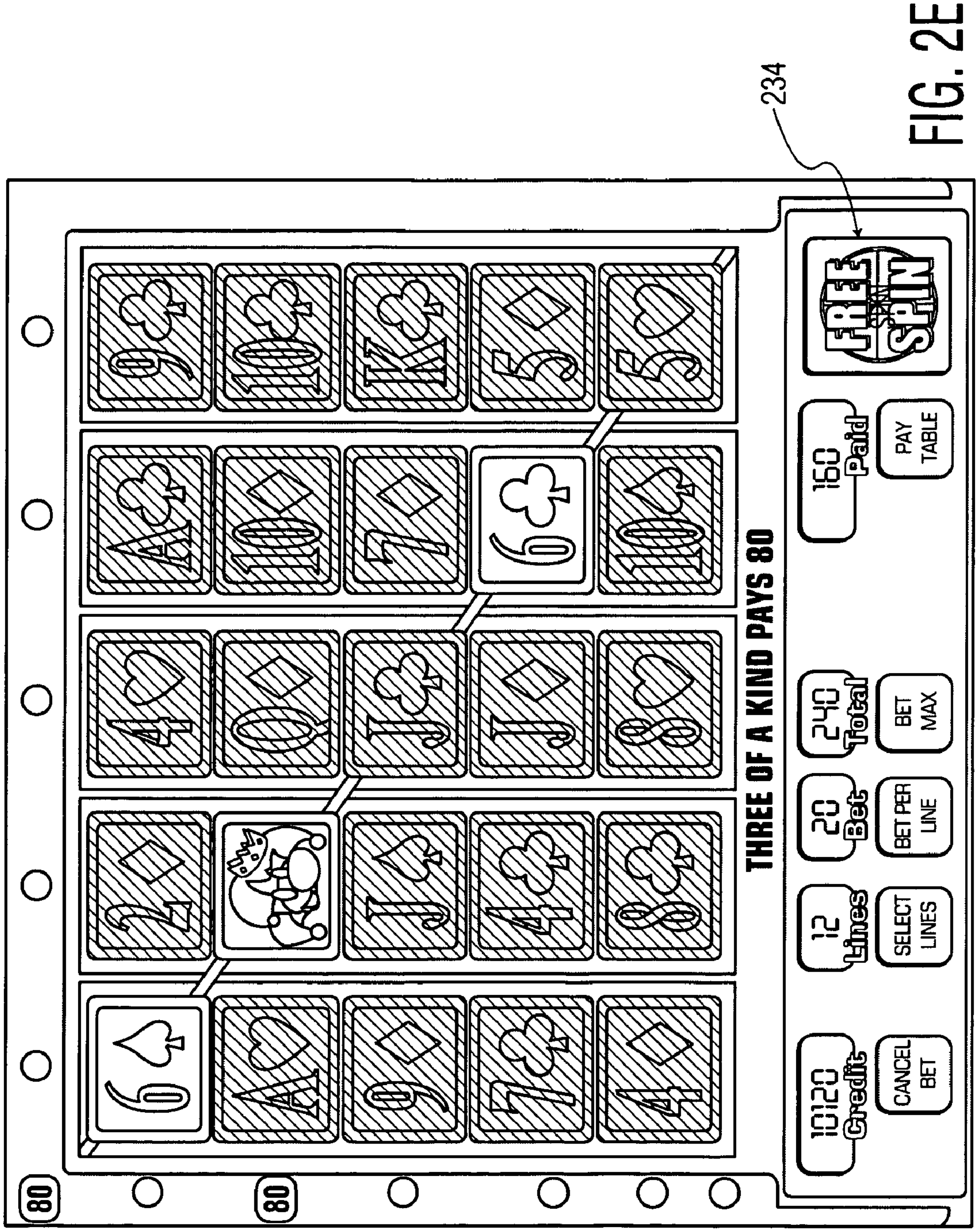

During the same spin, with reference to FIG. 2E, the at least one processor determines that a three-of-a-kind poker hand can be obtained by the diagonal betting line (top left to bottom right), if the Super Joker substitutes for a six. The at least one processor then substitutes a six for the Super Joker. The at least one processor selects either the six of hearts or the six of diamonds. The at least one processor then awards the player 80 credits for the three-of-a-kind and the message line 226 displays "THREE OF A KIND PAYS 80." The 80 credits are computed by the at least one processor as follows using the pay table shown by Table 1: 20 credits bet per betting line times one credit (see pay table) times four (multiplier for the Super Joker) equals 80 credits. Hence, the PAID window 212 displays 160 for the entire spin and the available credits following the spin are 10120 (9960 plus 160 equals 10120) as indicated by the CREDIT window 204. Additionally, during this spin, the Free Spin card was displayed by the matrix 228 and the SPIN button 224 is replaced by a Free Spin icon 234 to notify the player of having been awarded a free spin.

Figure 2F:
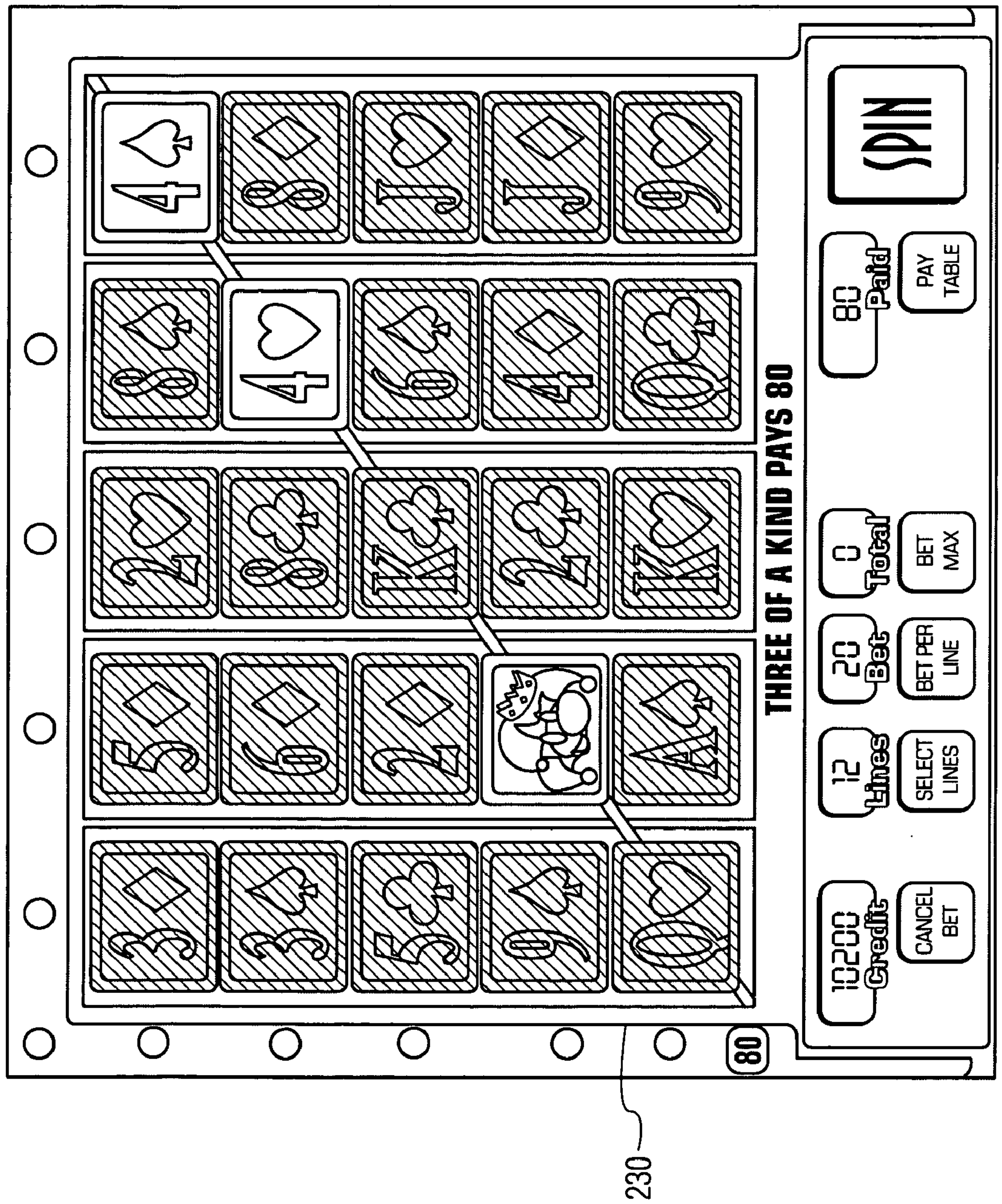

The free spin is played immediately following the spin in which the free spin was awarded. FIG. 2F shows the outcome of the free spin where all 12 betting lines are played and the bet per betting line is 20 credits (the same betting lines and the same bet per betting line as in the spin preceding the free spin). Since it is a free spin, the player does not bet any of his available credits. Hence, the TOTAL window 210 displays 0.

During the free spin, with continued reference to FIG. 2F, a Super Joker 230 is displayed by the matrix 228. The at least one processor determines that a three-of-a-kind poker hand can be obtained by the diagonal betting line (bottom left to top right), if the Super Joker substitutes for a four. The at least one processor then substitutes a four for the Super Joker. The at least one processor can only select the four of clubs, since the fours of the other suits are already displayed by the matrix 228. The at least one processor then awards the player 80 credits for the three-of-a-kind and the message line 226 displays "THREE OF A KIND PAYS 80." The 80 credits are computed by the at least one processor as follows using the pay table shown by Table 1: 20 credits bet per betting line times one credit (see pay table) times four (multiplier for the Super Joker) equals 80 credits. Hence, the PAID window 212 displays 80 for the entire spin and the available credits following the free spin are 10200 (10120 plus 80 equals 10200) as indicated by the CREDIT window 204.

Figure 2G:
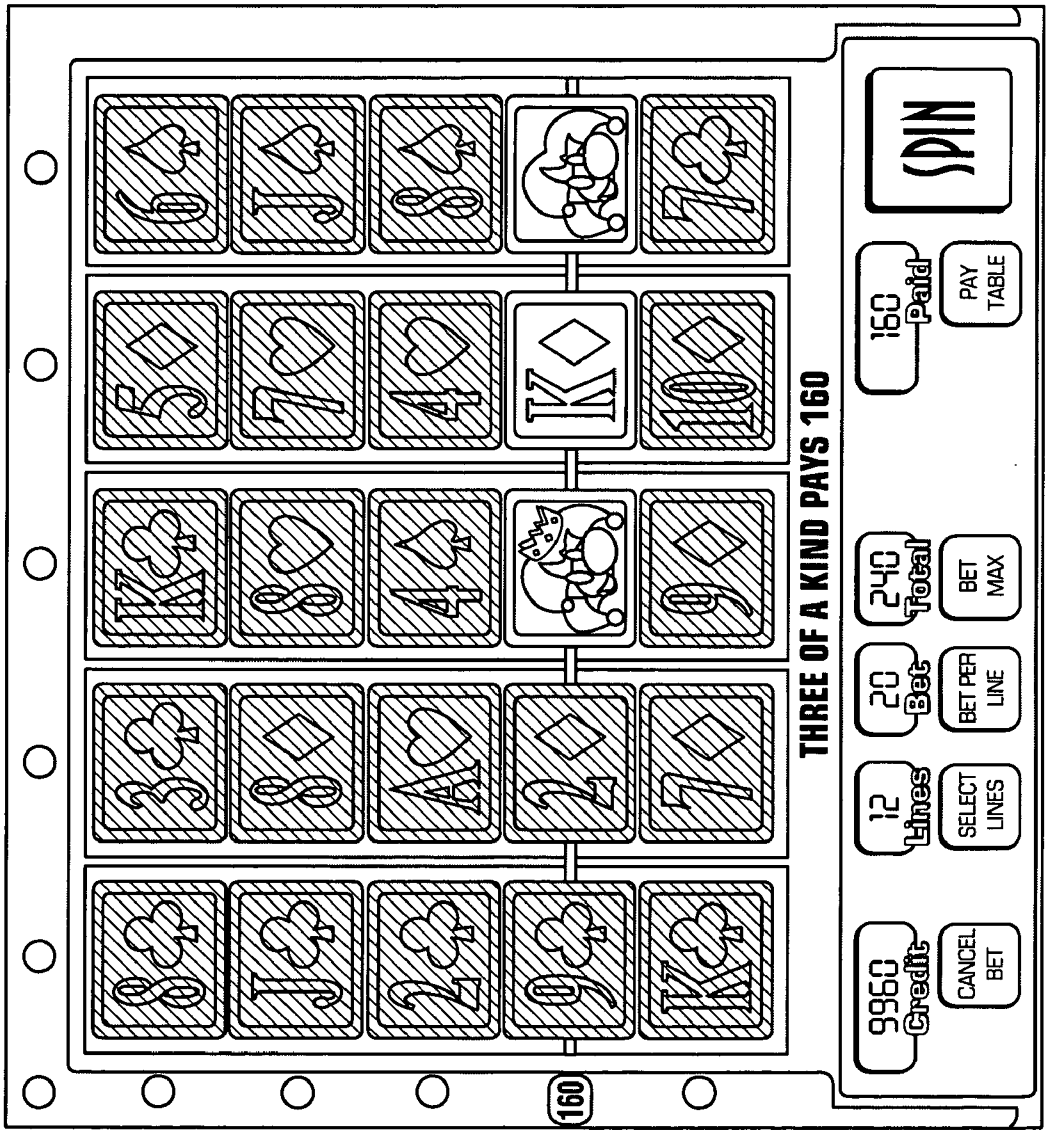

Prior to touching the SPIN button 224 again, the player selects all 12 betting lines again as indicated by LINES window 206 in FIG. 2G. The player bets 20 credits per betting line as indicated by BET window 208 for a total of 240 credits bet as indicated by TOTAL window 210. Hence, the total number of available credits is 9960.

After selecting to play all 12 betting lines and placing a bet for each betting line, the player touches the SPIN button 224 and cards are displayed by the matrix 228 of the graphical user interface 200. The cards include 23 cards from a standard deck, the Super Joker card 230 and the Joker card 232. The at least one processor then determines that the best poker hand that can be obtained by the fourth row of the matrix 228 is a three-of-a-kind if the Super Joker and Joker substitute for a king.

Accordingly, the at least one processor substitutes the Joker for a king and the at least one processor also substitutes the Super Joker for a king. The at least one processor then awards the player 160 credits for the three-of-a-kind and the message line 226 displays "THREE OF A KIND PAYS 160." The 160 credits are computed by the at least one processor as follows using the pay table shown by Table 1: 20 credits bet per betting line times one credit (see pay table) times eight (multiplier due to the appearance of a Joker card and a Super Joker card on the same betting line) equals 160 credits. Hence, the PAID window 212 displays 160.

Figure 2H:
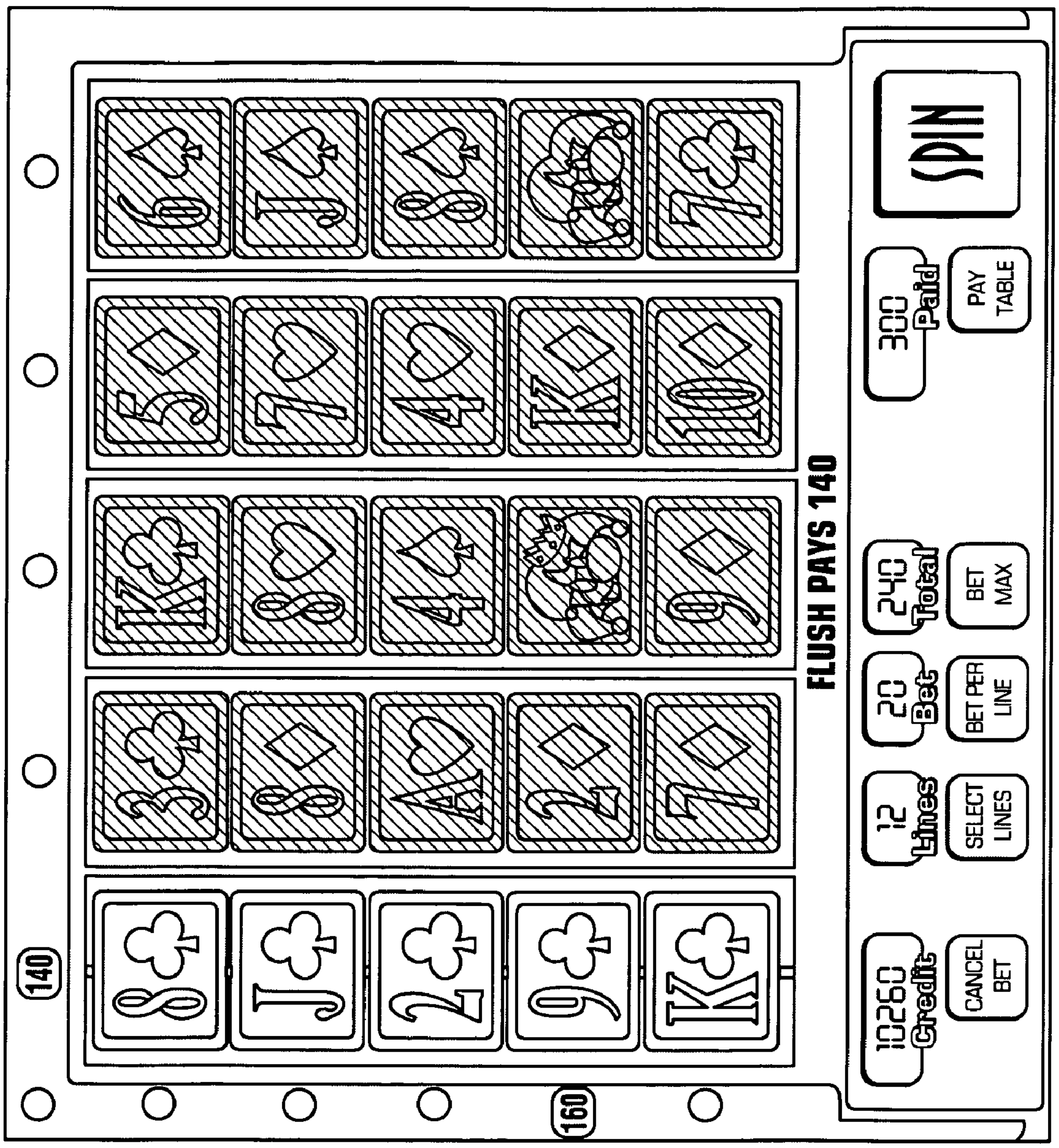

During the same spin, with reference to FIG. 2H, the at least one processor determines that the leftmost vertical reels display a flush. The at least one processor then awards the player 140 credits for the flush and the message line 226 displays "FLUSH PAYS 140." The 140 credits are computed by the at least one processor as follows using the pay table shown by Table 1: 20 credits bet per betting line times seven credits (see pay table) equals 140 credits. Hence, the PAID window 212 displays 300 for the entire spin and the available credits following the spin are 10260 (9960 plus 300 equals 10260) as indicated by the CREDIT window 204.

Bonus Game

As stated above, a player qualifies for the bonus game of the poker matrix game of the present disclosure, if a selected betting line of the 5×5 matrix 228 during the main game displays a predetermined set of cards, such as, for example, a natural Flush (no wild cards in the selected betting line). If the matrix 228 displays more than one Flush during a given spin or turn in two or more selected betting lines, the player receives a bonus multiplier equal to the number of Flushes obtained.

Each card displayed by the matrix which forms the predetermined set of cards is highlighted, overlaid with a "Bonus" symbol or icon, etc. to notify the player that he qualified for the bonus game. The player can also be notified by additional graphics displayed on the graphical user interface 200, such as a message displayed by the message line 226. Sounds can also be used to notify the player of qualifying for the bonus game.

A player can also qualify for playing the bonus game if other conditions are satisfied, such as, for example, attaining total winnings of more than 500 credits during a series of sequential game plays using the same credit card, prepaid gaming card, or debit card, the matrix 228 displaying the Super Joker card and Joker card on the same betting line (as shown in FIG. 2G, for example), etc.

In an exemplary embodiment of the present disclosure, one of three different games are selected and played by the player during the bonus game of the poker matrix game. The three games are: Hi-Lo, Beat the Dealer and Card Flip.

Figure 3A:
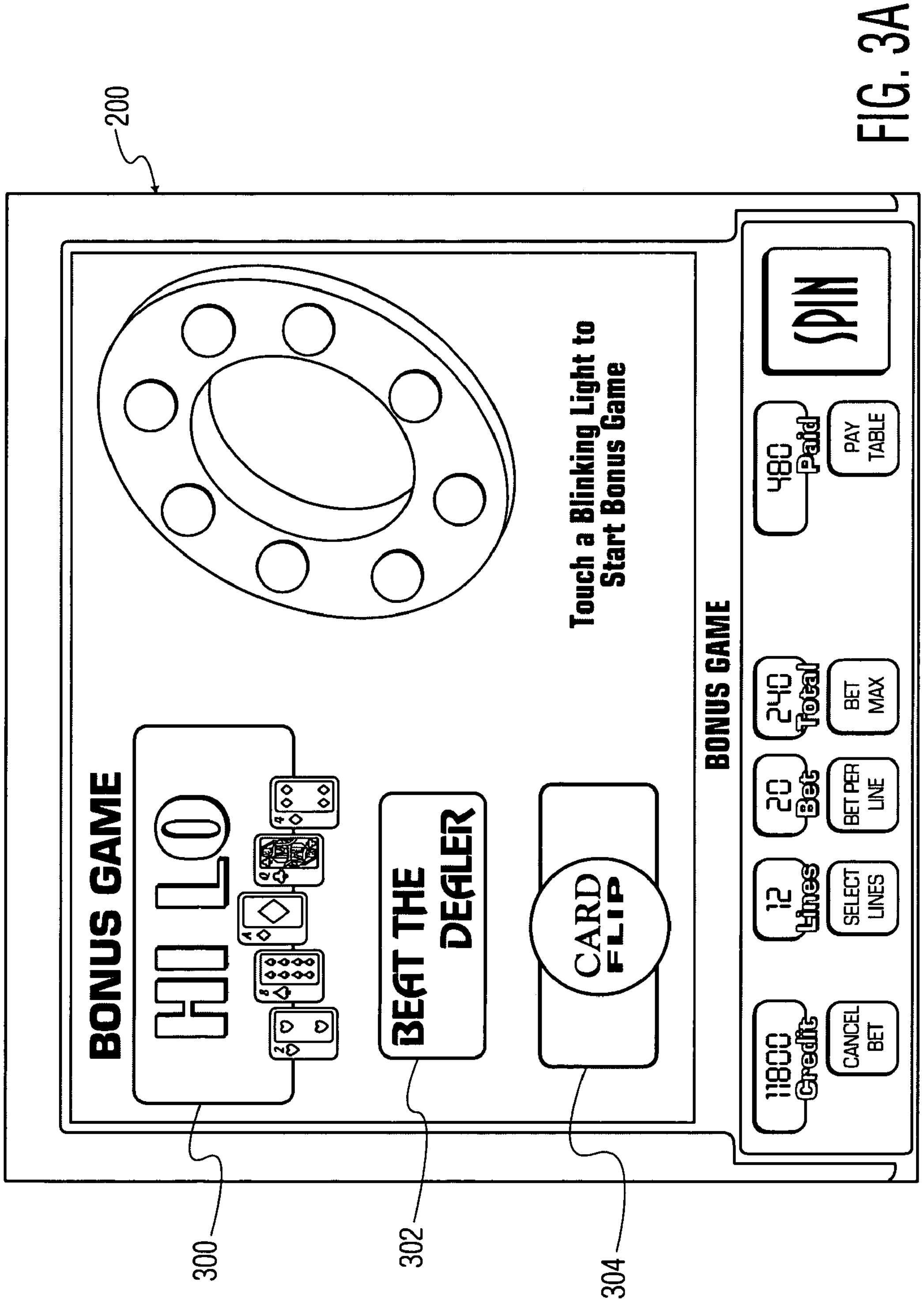
FIGS. 3A–3H illustrate progressive screen views showing game play of a HI Lo game of the bonus game of the poker matrix game in accordance with the present disclosure.

With reference to FIG. 3A, the player touches a blinking light as indicated in FIG. 3A and then the at least one processor selects one of the three games to play during the bonus game. The three games are indicated by icons 300, 302, 304 which are displayed by the graphical user interface 200. After playing one of the games of the bonus game from start to finish, the player's earned credits are multiplied by a random multiplier selected from two to ten to compute the amount of bonus credits to award the player as further described below with reference to each game of the bonus game.

Bonus Game: Hi-Lo Game

Figure 3B:
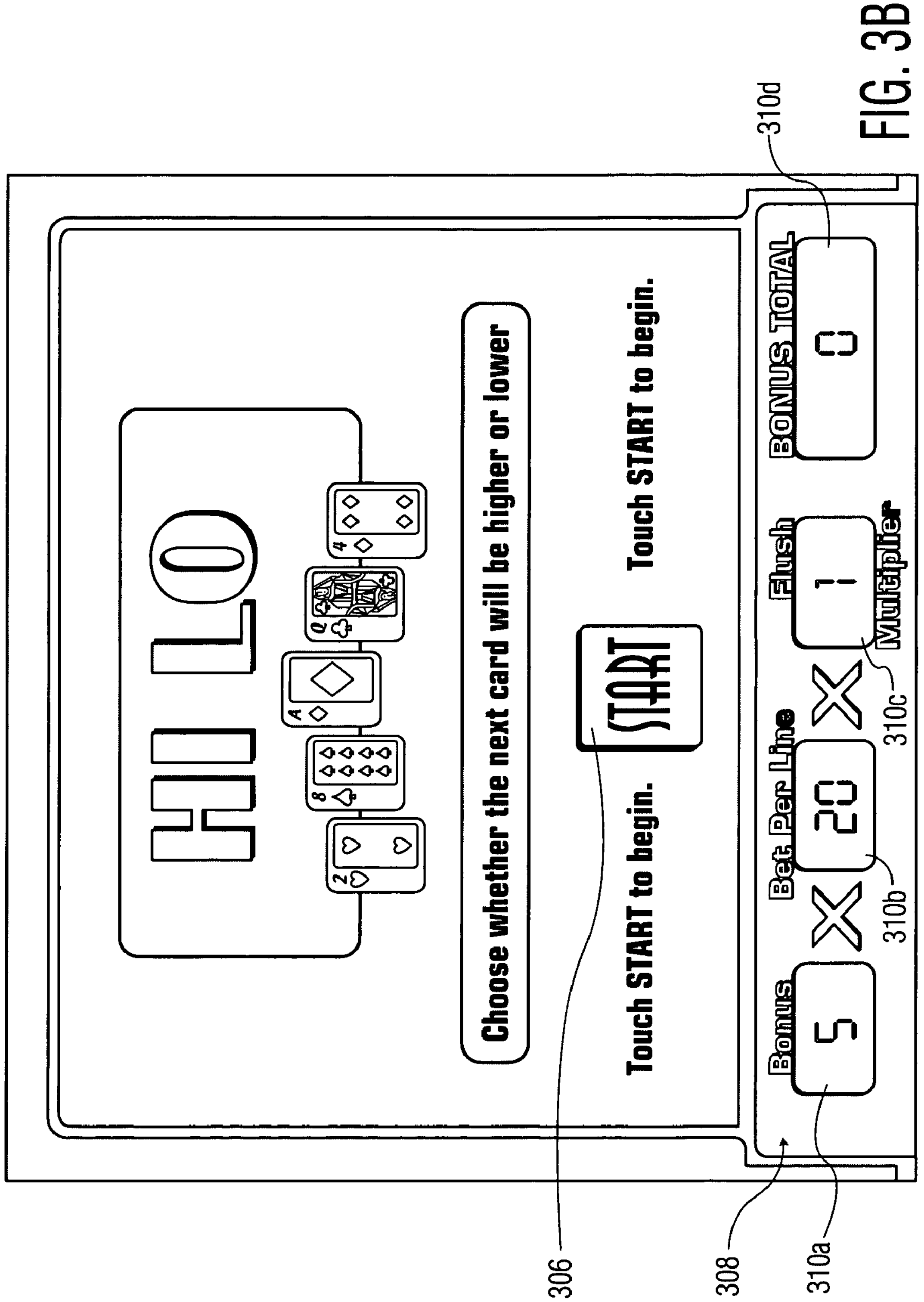

If the at least one processor randomly selects the Hi-Lo game, the graphical user interface 200 displays the graphic shown by FIG. 3B which includes a START button 306 for starting the Hi-Lo game. A lower portion of the graphical user interface 200 displays a computation indicator 308 for continuously displaying the amount of credits awarded to the player during bonus game play.

The computation indicator 308 includes four windows 310*a–d*. The values displayed by the first three windows 310-*c* are multiplied and the product is displayed by the fourth window 310*d*. The first window 310*a* indicates the amount of bonus credits awarded by the at least one processor to the player for qualifying for the bonus game. In the exemplary bonus game play shown by FIG. 3B, five credits are awarded to the player. These initial five credits are also indicated by a NEXT CARD VALUE window 311. The second window 310*b* indicates the amount bet per betting line for the spin which qualified the player for the bonus game. The third window 310*c* indicates the flush multiplier which is equal to the number of flushes obtained for the spin which qualified the player for the bonus game.

Figure 3C:
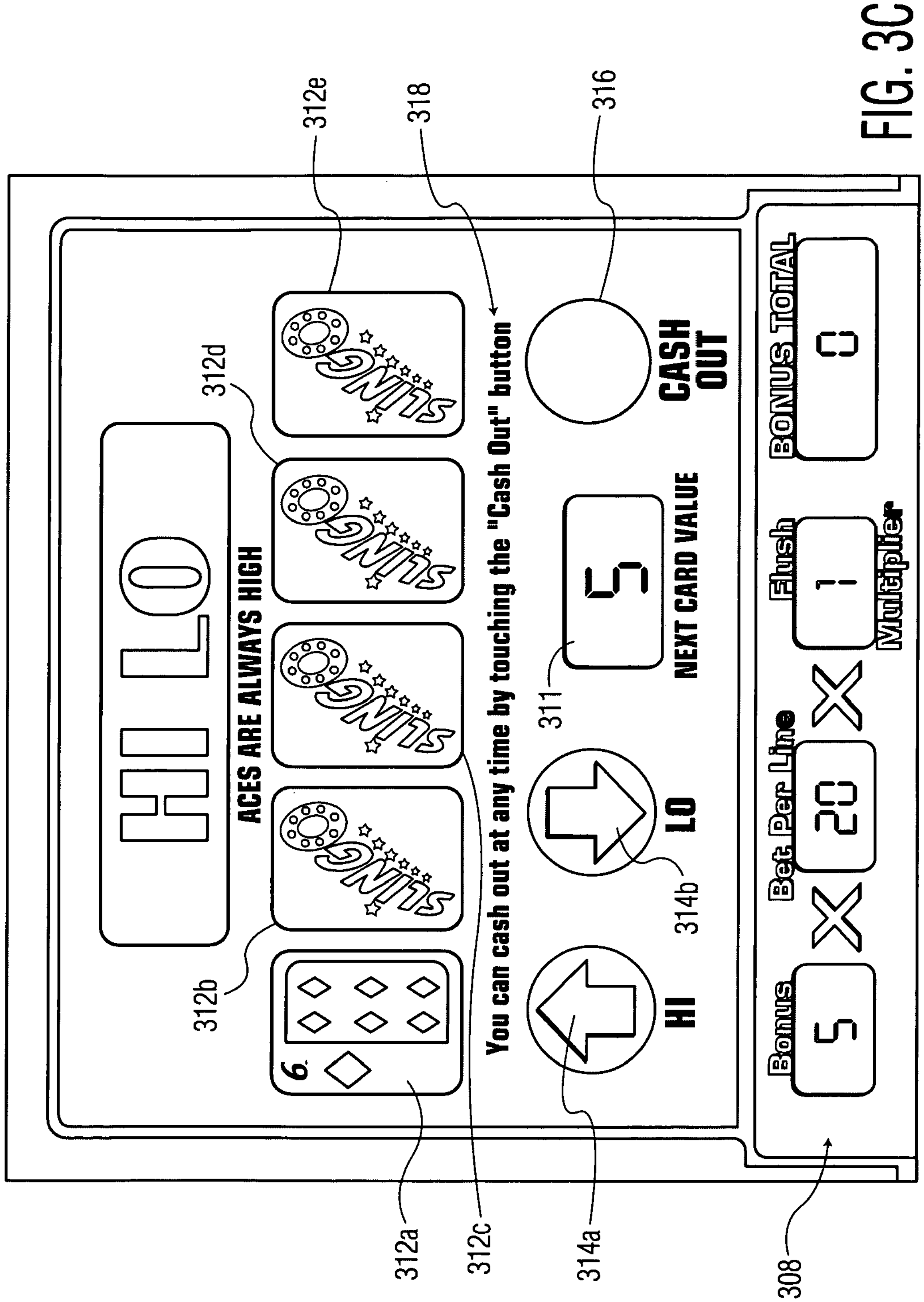

After the START button 306 is touched, the graphical user interface 200, as shown by FIG. 3C, displays five cards 312*a–e* randomly selected from a standard 52-card deck. The first card 312*a* is face up while the rest of the cards 312*b–e* are face down. The graphical user interface 200 further displays two virtual buttons 314*a* and 314*b* for selecting whether the card 312*b* will be higher or lower, respectively, than the face up card 312*a*.

The player uses these buttons 314*a* and 314*b* for selecting whether the next card that is turned over will be higher or lower than the face up card to its left. The "Ace" is considered the highest card and the "2" the lowest. If the player is correct, the player's credits are doubled and play proceeds to the next card, if there is a remaining face down card. If it is a "Push," i.e. both cards have the same value, then there is a no win-no lose situation and play proceeds to the next card, if there is a remaining face down card. If the player is incorrect, the bonus game ends and the player receives a consolation bonus of 5 credits. The player's total bonus credits are then multiplied by the amount bet per betting line during the spin of the main game which qualified the player for the bonus game times the flush multiplier (if applicable). The final total number of bonus credits which the player has at the end of the Hi Lo game, if the player successfully completes the game, is multiplied by a random multiplier (see FIG. 3H).

With continued reference to FIG. 3C, the player can opt to cash out at any time during the Hi-Lo bonus game with his current total winnings by selecting the "CASH OUT" button 316. The player is notified that he can cash out at any time by a message 318 displayed below the five cards 312_a–e_. After cashing out, the player terminates bonus game play and can then proceed with the main game of the poker matrix game, if so desired.

Figure 3D:
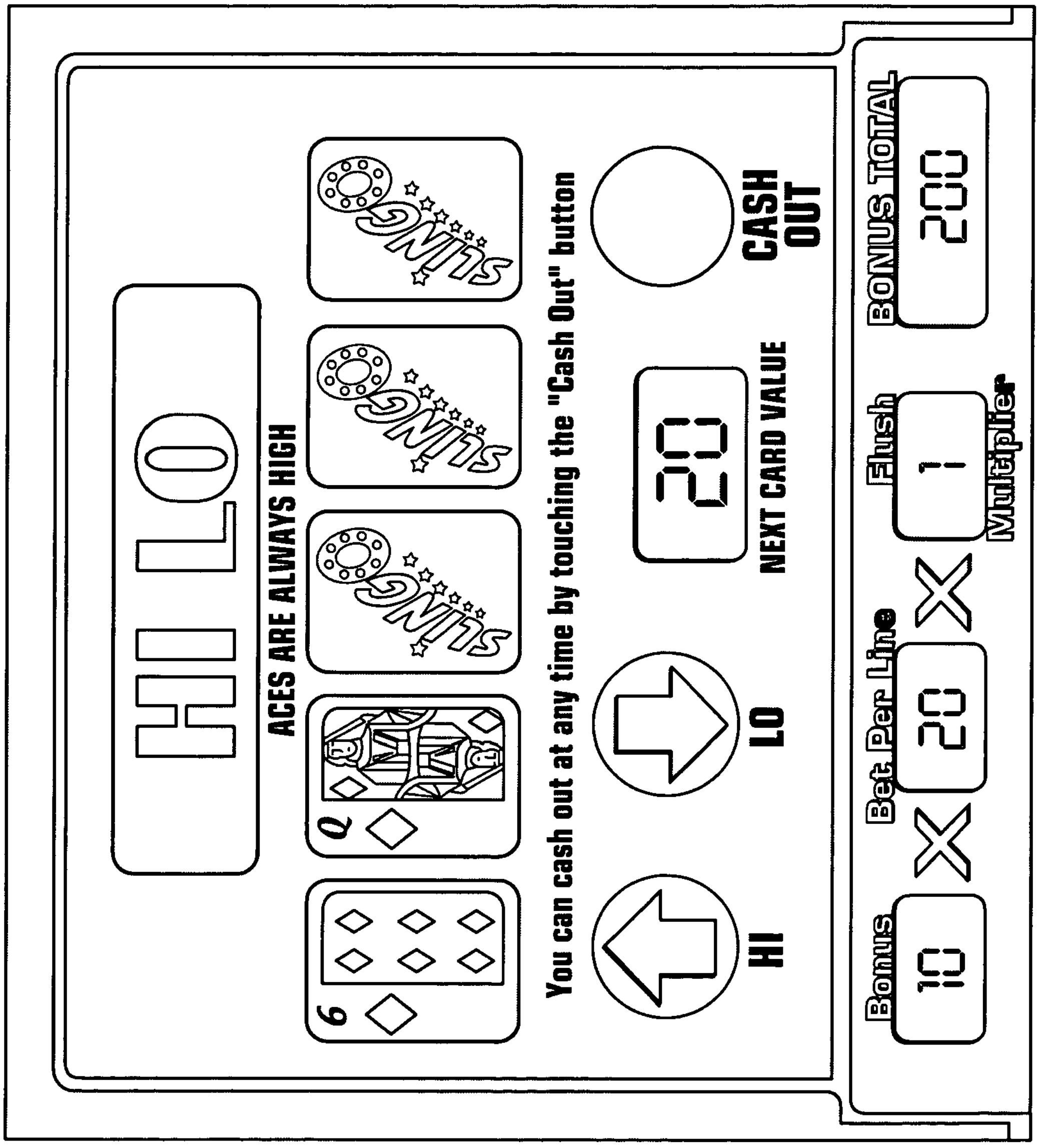

During play of the Hi-Lo game, the player guesses that face down card 312_b_ will be higher than the face up card 312_a_ or the six of diamonds. The player then "touches" the virtual button 314_a_ to indicate that he believes the face down card 312_b_ is higher than the face up card 312_a_. The face down card 312_b_ is then turned over by the at least one processor to reveal the queen of diamonds, as shown by FIG. 3D, which is higher than the six of diamonds. Accordingly, the player is awarded five bonus credits and the player now has ten bonus credits as shown by the BONUS window 310_a_. Therefore, the player has a total of 200 bonus credits as indicated by the BONUS TOTAL window 310_d_ after card 312_b_ is turned over. The value of the next face down card 312_c_ is 20 credits as indicated by the NEXT CARD VALUE window 311.

Figure 3E:
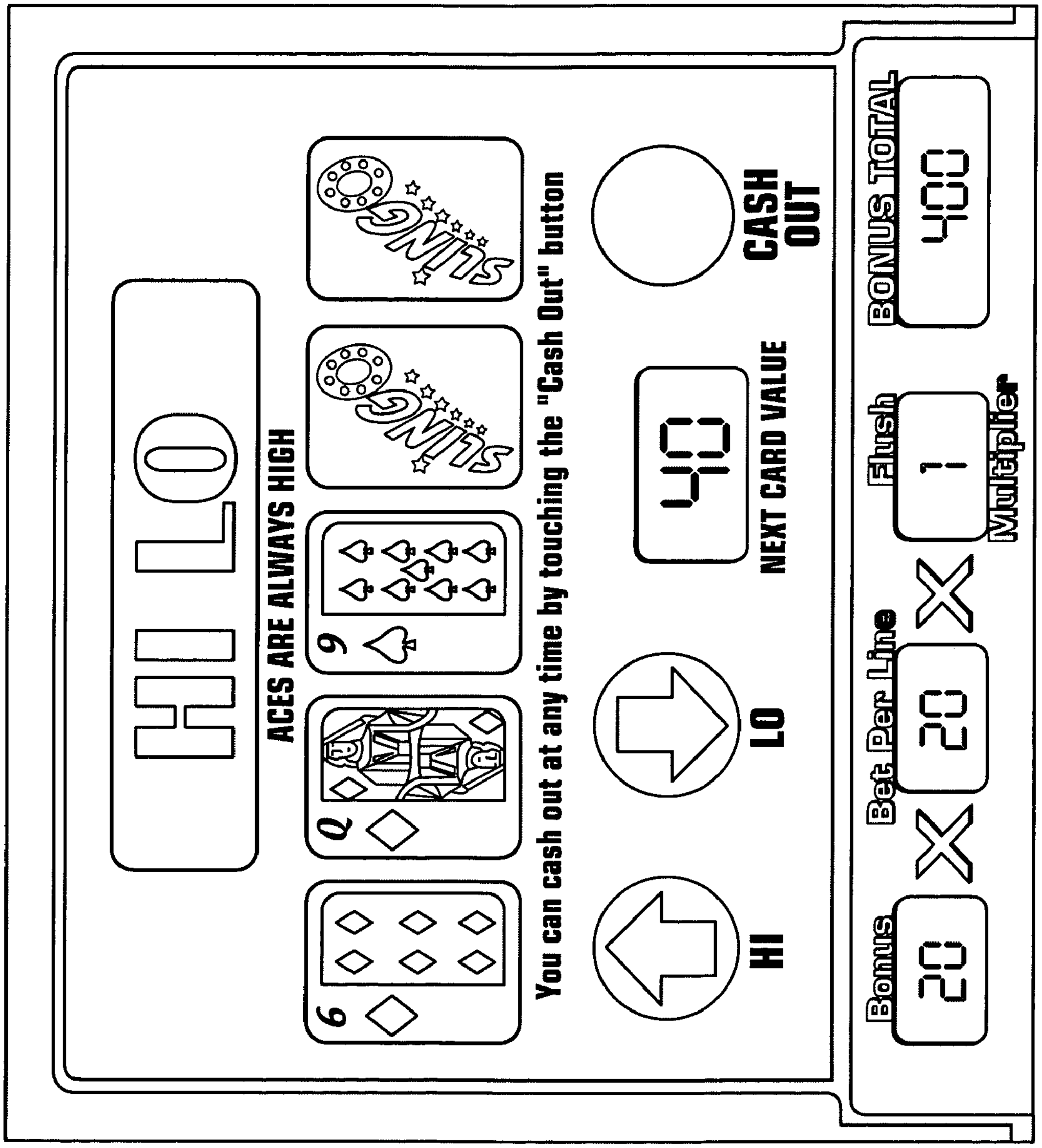

The player then guesses that next face down card 312_c_ will be lower than the face up card 312_b_ or the queen of diamonds. The player then "touches" the virtual button 314_b_ to indicate that he believes the face down card 312_c_ is lower than the face up card 312_b_. The face down card 312_c_ is then turned over by the at least one processor to reveal the nine of spades, as shown by FIG. 3E, which is lower than the queen of diamonds. Accordingly, the player is awarded twenty bonus credits as shown by the BONUS window 310_a_. Therefore, the player has a total of 400 bonus credits as indicated by the BONUS TOTAL window 310_d_ after card 312_c_ is turned over. The value of the next face down card 312_d_ is 40 credits as indicated by the NEXT CARD VALUE window 311.

Figure 3F:
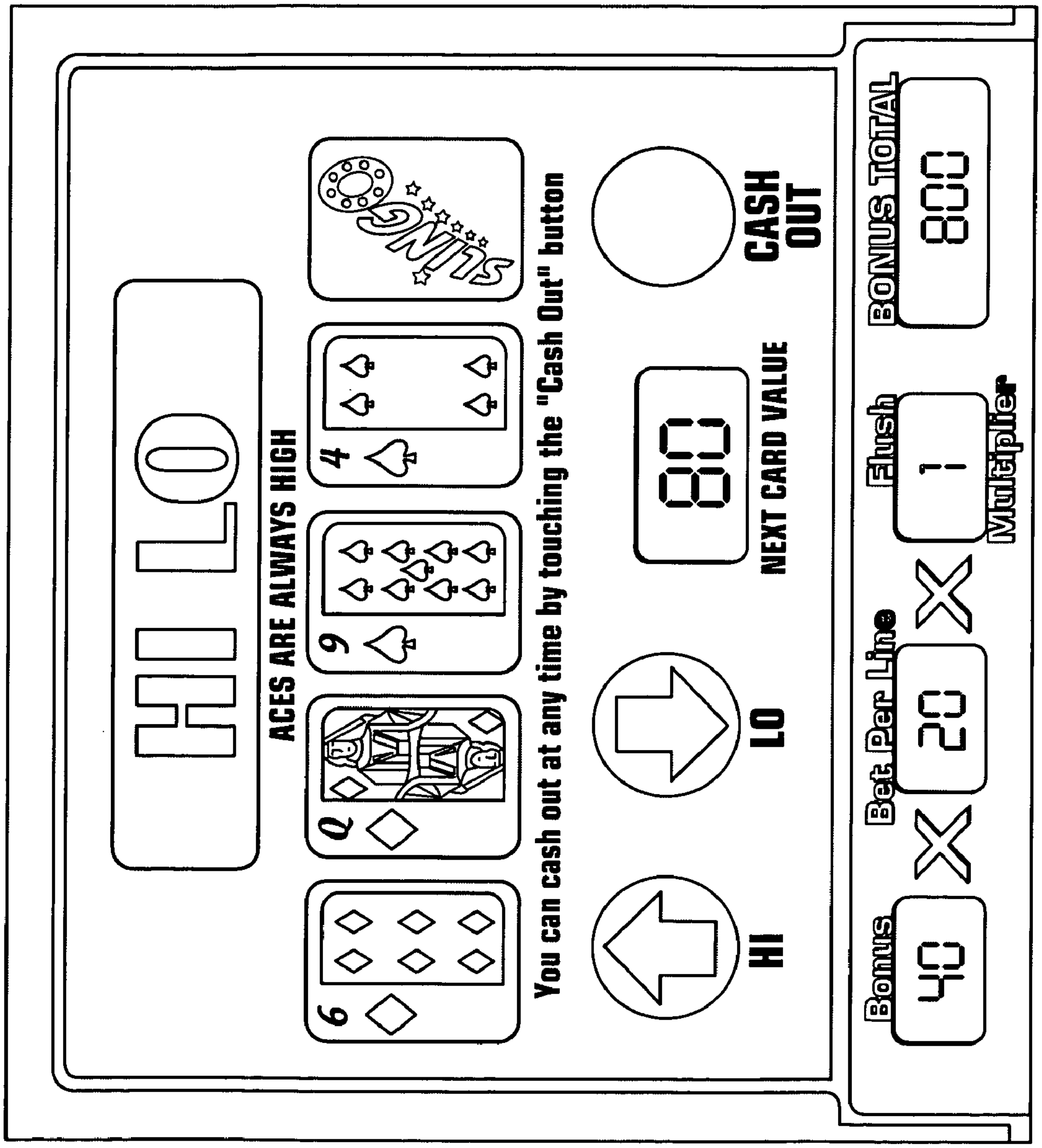

The player guesses that next face down card 312_d_ will be lower than the face up card 312_c_ or the nine of spades. The player then "touches" the virtual button 314_b_ to indicate that he believes the face down card 312_d_ is lower than the face up card 312_c_. The face down card 312_d_ is then turned over by the at least one processor to reveal the four of spades, as shown by FIG. 3F, which is lower than the nine of spades. Accordingly, the player is awarded forty bonus credits as shown by the BONUS window 310_a_. Therefore, the player has a total of 800 bonus credits as indicated by the BONUS TOTAL window 310_d_ after card 312_d_ is turned over. The value of the next face down card 312_e_ is 80 credits as indicated by the NEXT CARD VALUE window 311.

Figure 3G:
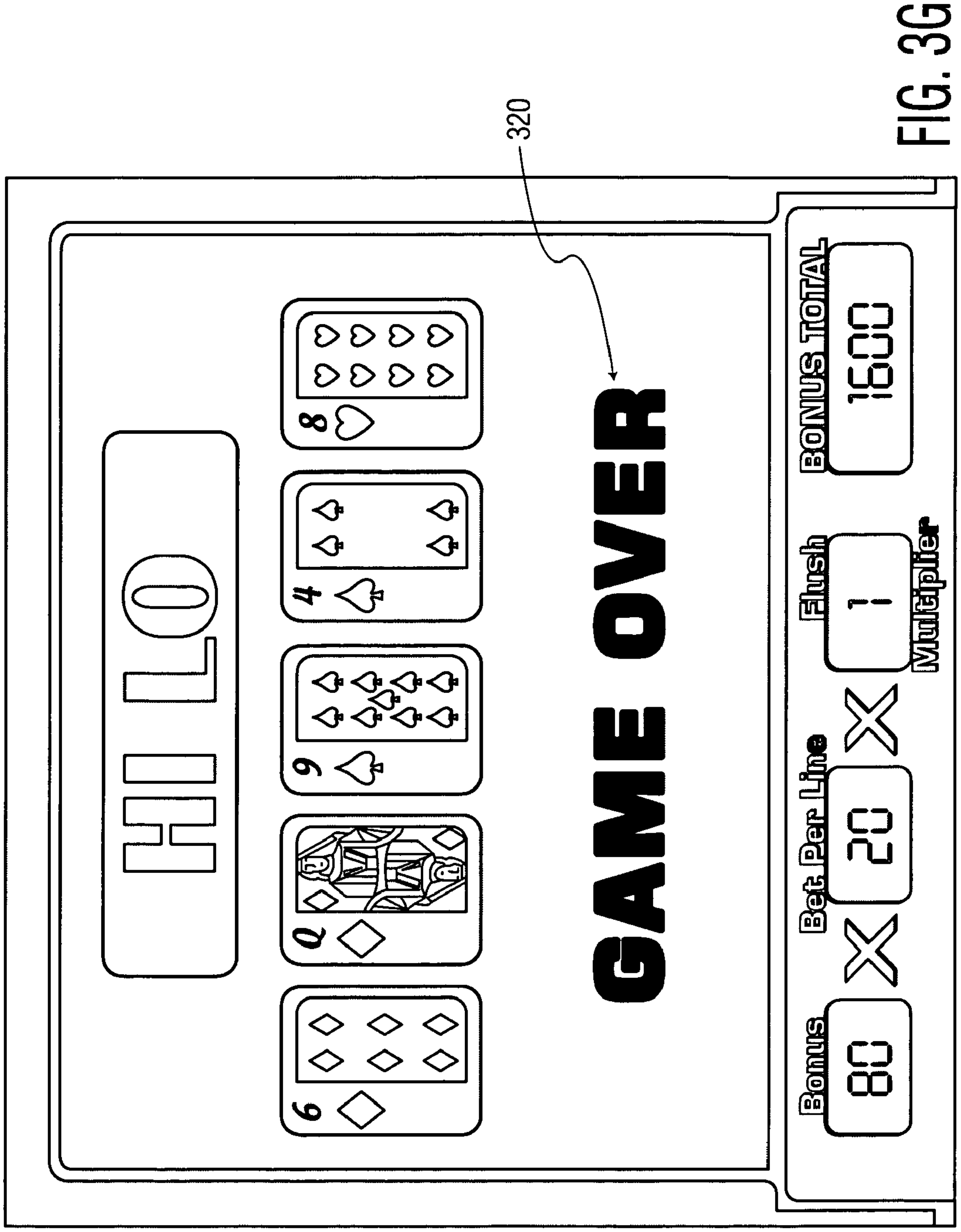

The player then guesses that next face down card 312_e_ will be higher than the face up card 312_d_ or the four of spades. The player then "touches" the virtual button 314_a_ to indicate that he believes the face down card 312_e_ is higher than the face up card 312_d_. The face down card 312_e_ is then turned over by the at least one processor to reveal the eight of hearts, as shown by FIG. 3G, which is higher than the four of spades. Accordingly, the player is awarded eighty bonus credits as shown by the BONUS window 310_a_. Therefore, the player has a total of 1600 bonus credits as indicated by the BONUS TOTAL window 310_d_ after card 312_e_ is turned over. The Hi Lo game is then over as indicated by graphic 320.

Figure 3H:
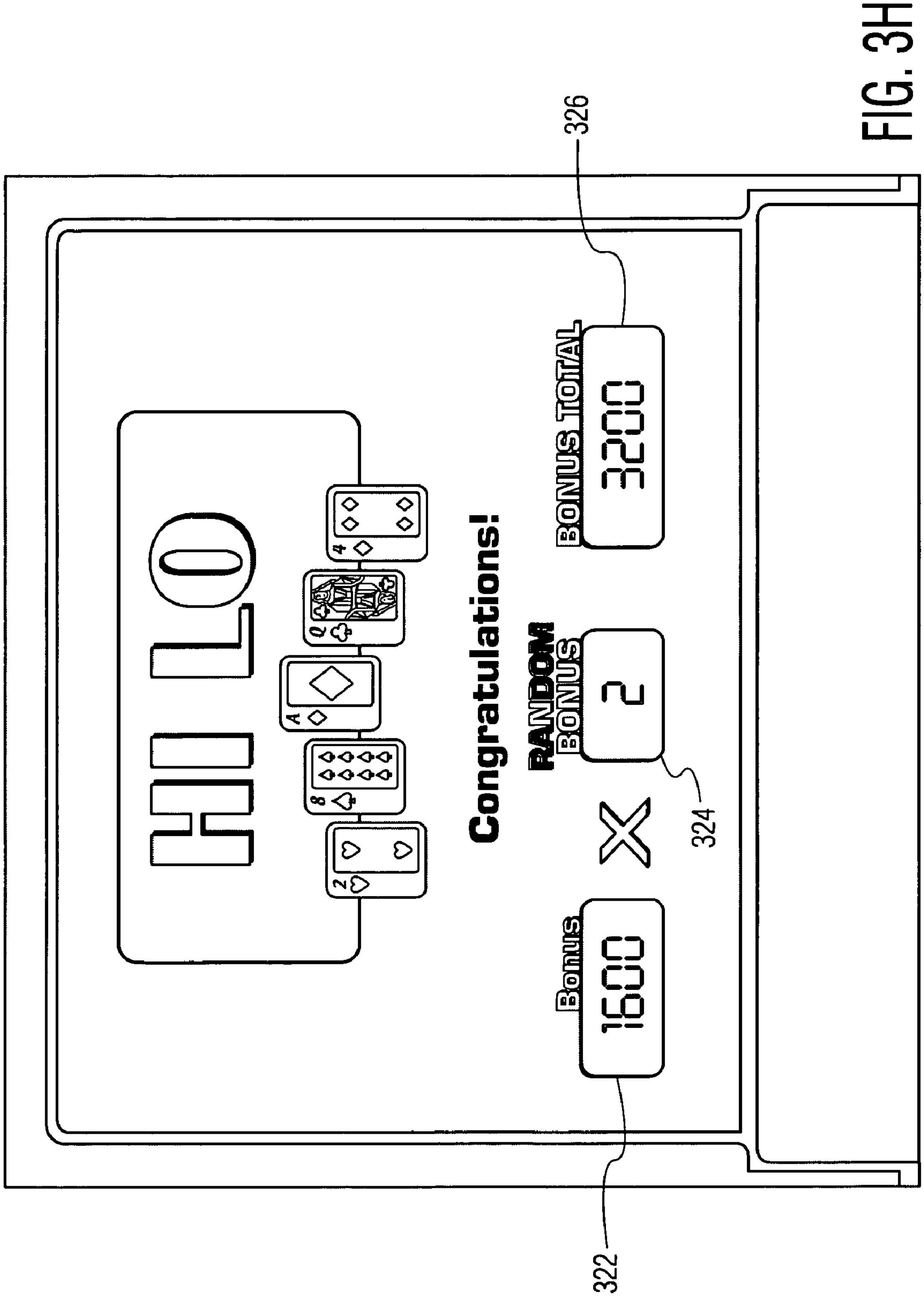

With reference to FIG. 3H, the total bonus credits displayed by window 322 are then multiplied by a random bonus multiplier (in this case two) displayed by window 324. Accordingly, the player is awarded a total of 3200 bonus credits for successfully playing the Hi Lo game from start to finish. The total of 3200 bonus credits is displayed by window 326.

Bonus Game: Beat the Dealer Game

Figure 4A:
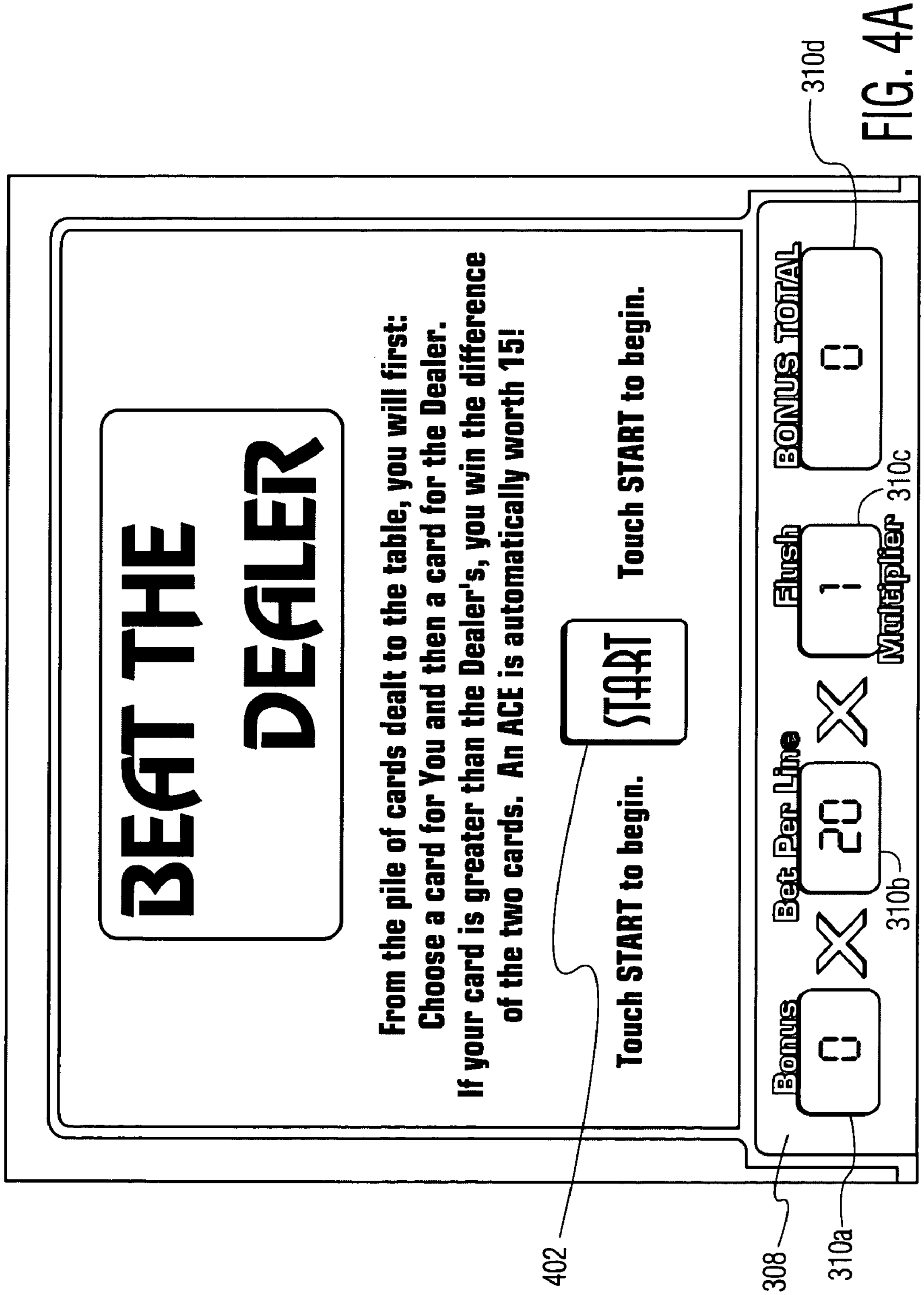
FIGS. 4A–4G illustrate progressive screen views showing game play of a Beat the Dealer game of the bonus game of the poker matrix game in accordance with the present disclosure.

If the at least one processor randomly selects the Beat the Dealer game, the graphical user interface 200 displays the graphic shown by FIG. 4A. In the Beat the Dealer game a total of 10 cards are dealt face down from a 36-card deck having numbers ranging from 2 to 10 and the Aces. Play begins with zero credits. From the ten cards dealt, the player selects one dealer card and one player card by "touching" the cards.

On each selection, until all cards are used, as further illustrated below with reference to FIGS. 4B–4G, if the player's card is lower than the dealer's card, the player loses that selection, or if the player's card is higher than the dealer's card, the player wins the difference between the two cards. If an ace is uncovered, an auto-win condition is determined by the at least one processor (player is awarded 15 credits). A minimum bonus of five credits are awarded to the player for playing the Beat the Dealer game, if the player does not have any credits at the end of the game.

If the player does have credits at the end of the game, the player's credits are multiplied by the amount bet per betting line during the spin or turn of the main game which initiated the bonus game times the flush multiplier (if applicable). The final total number of bonus credits which the player has at the end of the Beat the Dealer game, if the player successfully completes the game, is multiplied by a random multiplier (see FIG. 4G).

With continued reference to FIG. 3A, a lower portion of the graphical user interface 200 displays the computation indicator 308 for continuously displaying the amount of credits awarded to the player during bonus game play.

As described above with reference to the Hi Lo game, the computation indicator 308 includes four windows 310_a–d_. The values displayed by the first three windows 310-_c_ are multiplied and the product is displayed by the fourth window 310_d_. In the Beat the Dealer game, the first window 310_a_ indicates zero credits prior to game play. The second window 310_b_ indicates the amount bet per betting line for the spin which qualified the player for the bonus game. The third window 310_c_ indicates the flush multiplier which is equal to the number of flushes obtained for the spin which qualified the player for the bonus game.

Figure 4B:
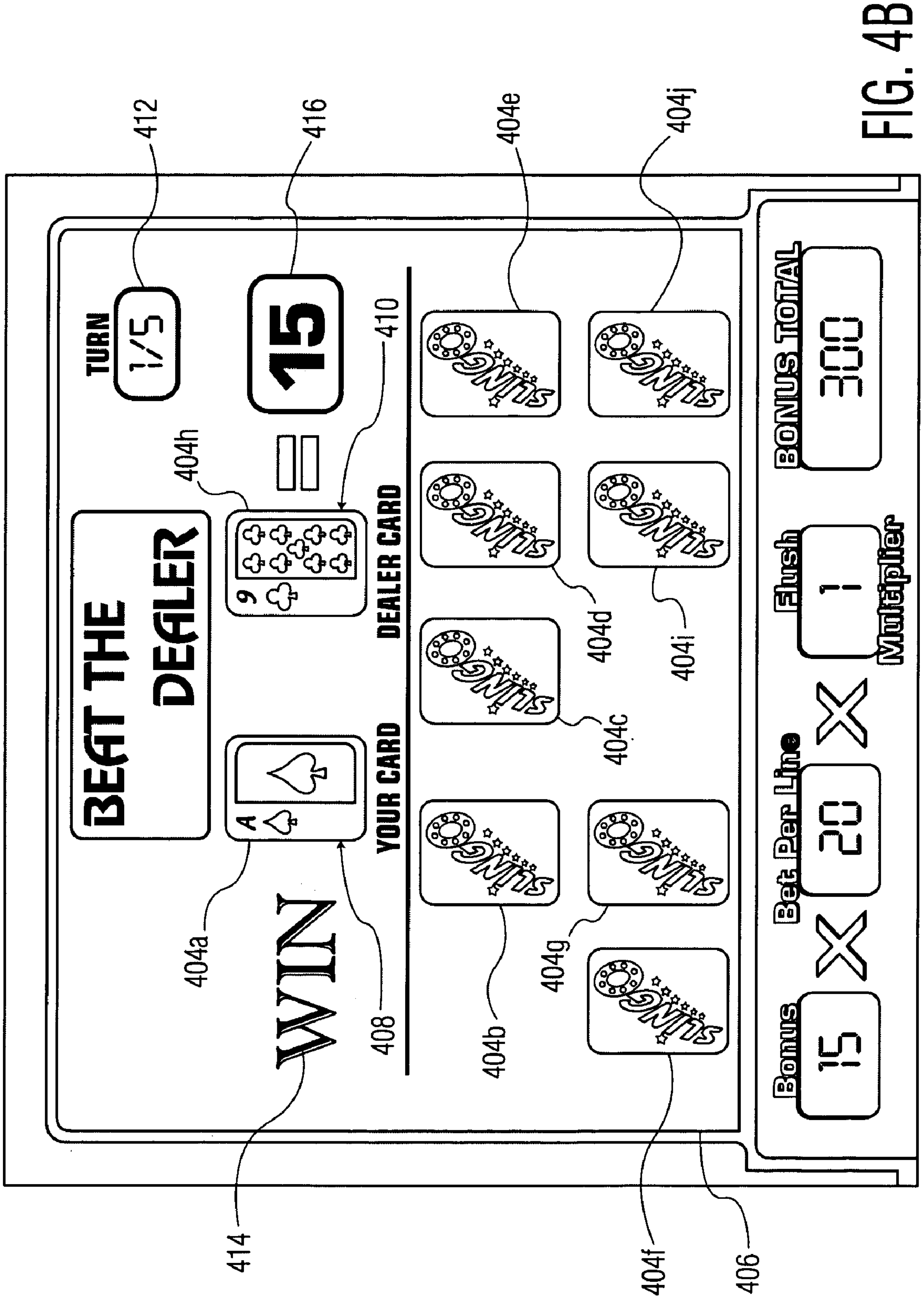

After the START button 402 in FIG. 4A is touched, the graphical user interface 200 displays ten cards 404_a–j_ face down on a lower portion 406 thereof, an area 408 for placing a player's card and an area 410 for placing a dealer's card (see FIG. 4B). A window 412 displayed by the graphical user interface 200 displays the turn number.

With reference to FIG. 4B, the player selects face down card 404_h_ as the dealer's card by "touching" the card first. The card is then moved to area 410 where it is turned over to reveal a nine of clubs. The player then selects face down card 404_a_ as the player's card by "touching" this card. The card is then moved to area 408 where it is turned over to reveal an ace of spades. The player's card beats the dealer's card and the player wins as indicated by graphic 414. The player is awarded fifteen bonus credits for obtaining an ace as indicated by window 416 and window 310_a_ to give the player a total of 300 bonus credits as indicated by window 310_d_.

Figure 4C:
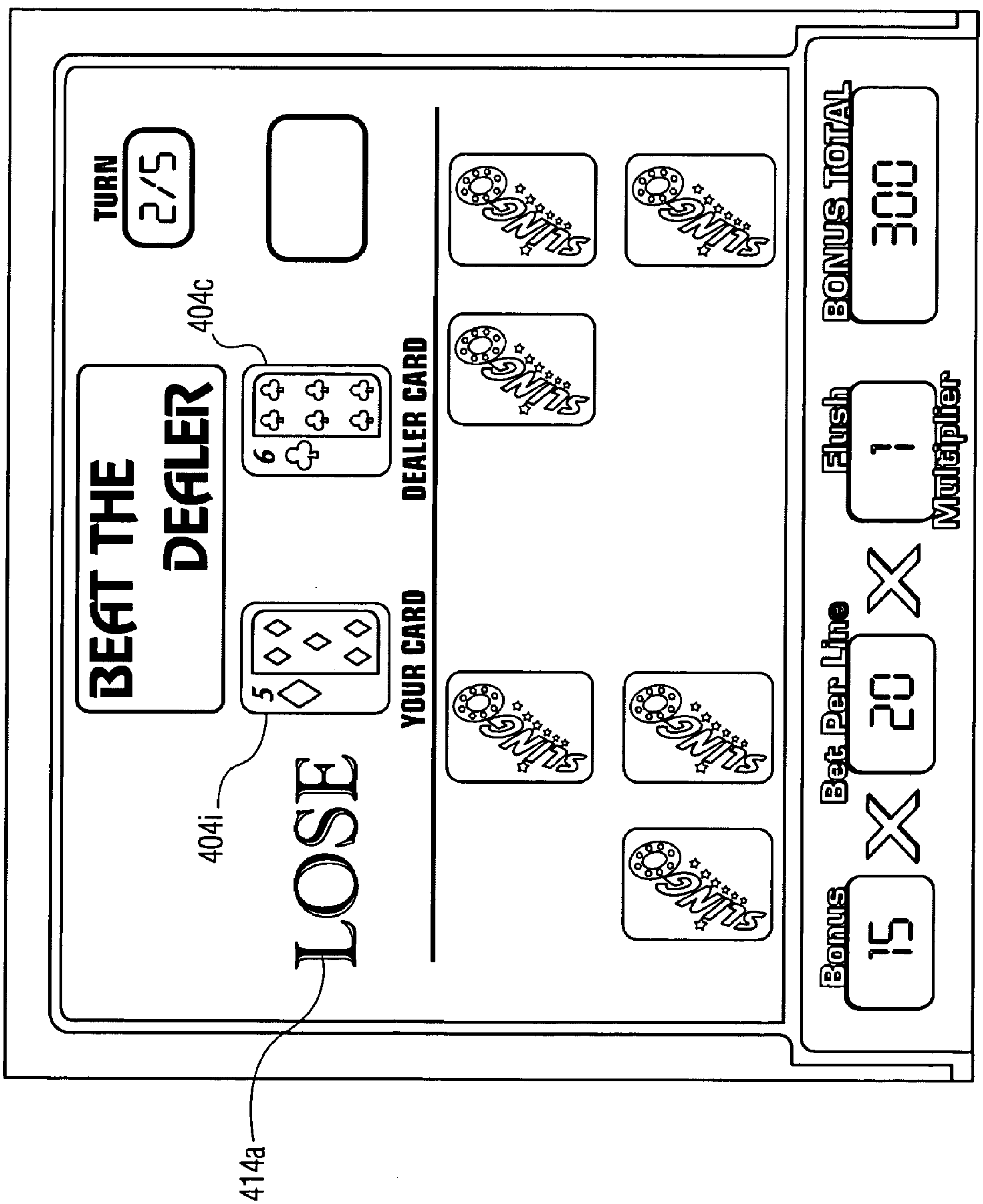

With reference to FIG. 4C, during the second turn as indicated by window 412, the player selects face down card 404_c_ as the dealer's card by "touching" the card first. The card is then moved to area 410 where it is turned over to reveal a six of clubs. The player then selects face down card 404*i* as the player's card by "touching" this card. The card is then moved to area 408 where it is turned over to reveal a five of diamonds. The player's card does not beat the dealer's card and the player loses as indicated by graphic 414*a*. The player is not awarded any bonus credits and the player still has 300 bonus credits as indicated by window 310*d*.

Figure 4D:
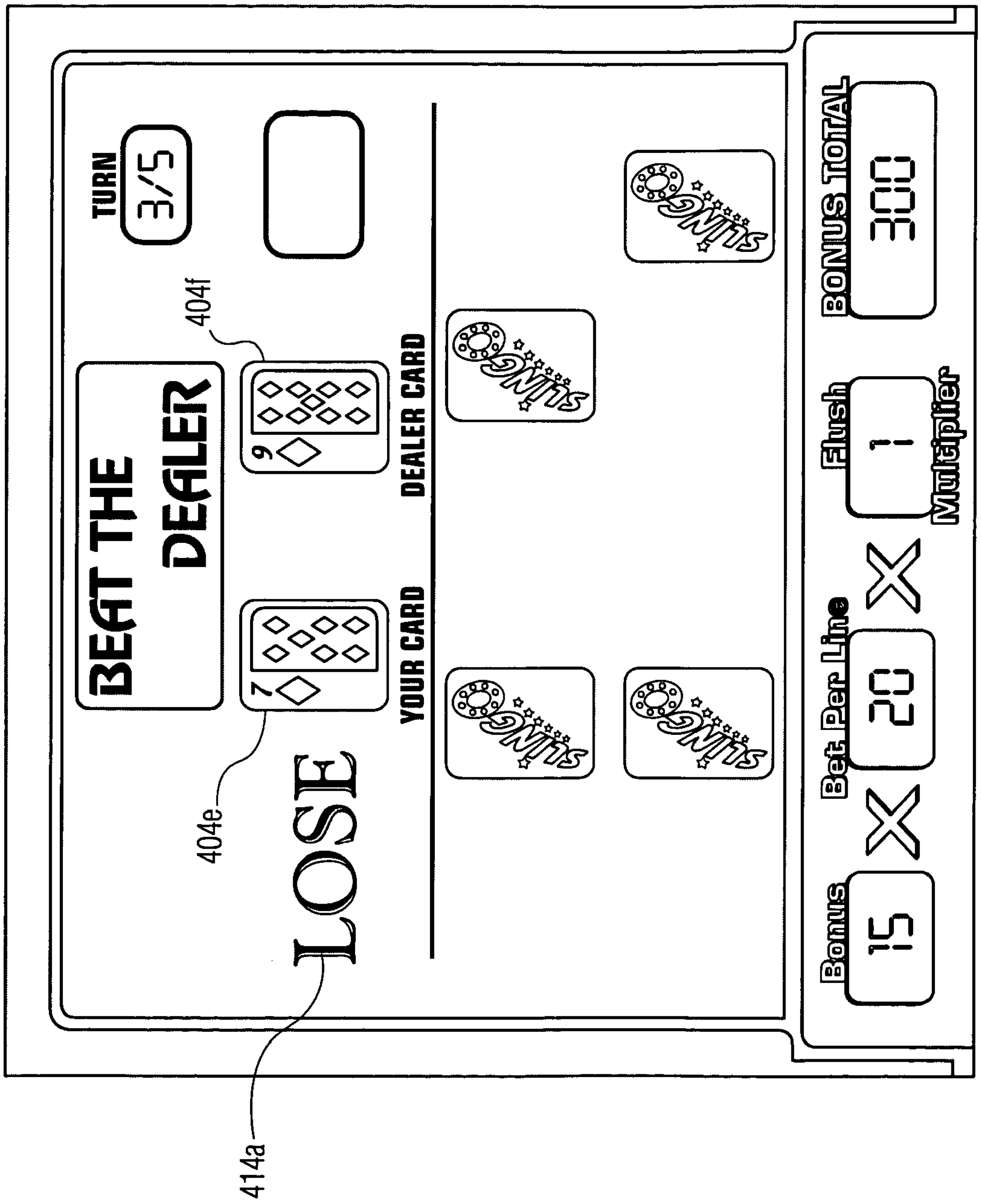

With reference to FIG. 4D, during the third turn as indicated by window 412, the player selects face down card 404*f* as the dealer's card by "touching" the card first. The card is then moved to area 410 where it is turned over to reveal a nine of diamonds. The player then selects face down card 404*e* as the player's card by "touching" this card. The card is then moved to area 408 where it is turned over to reveal a seven of diamonds. The player's card does not beat the dealer's card and the player loses as indicated by graphic 414*a*. The player is not awarded any bonus credits and the player still has 300 bonus credits as indicated by window 310*d*.

Figure 4E:
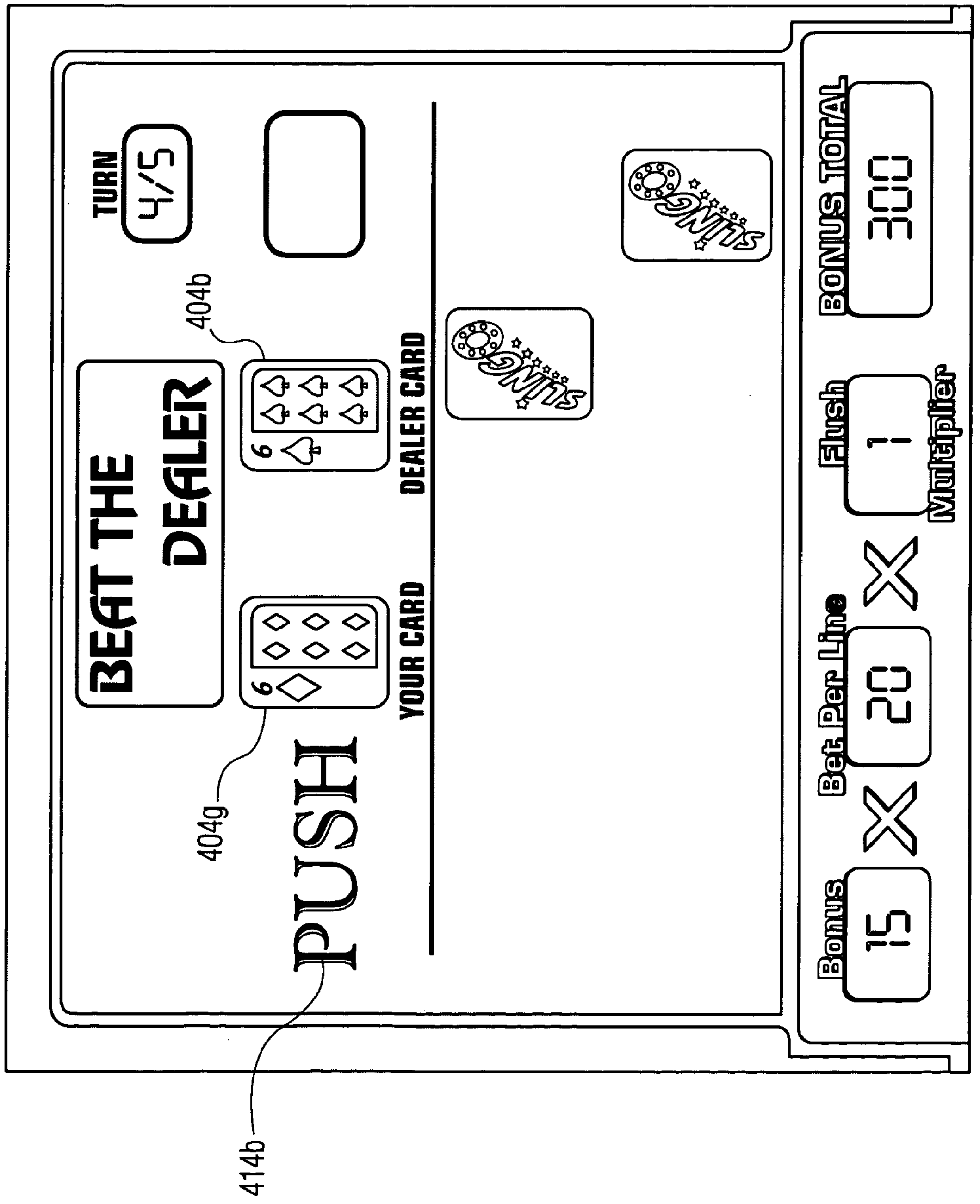

With reference to FIG. 4E, during the fourth turn as indicated by window 412, the player selects face down card 404*b* as the dealer's card by "touching" the card first. The card is then moved to area 410 where it is turned over to reveal a six of spades. The player then selects face down card 404*g* as the player's card by "touching" this card. The card is then moved to area 408 where it is turned over to reveal a six of diamonds. A push is determined by the at least one processor as indicated by graphic 414*b* and the player is not awarded any bonus credits. The player still has 300 bonus credits as indicated by window 310*d*.

Figure 4F:
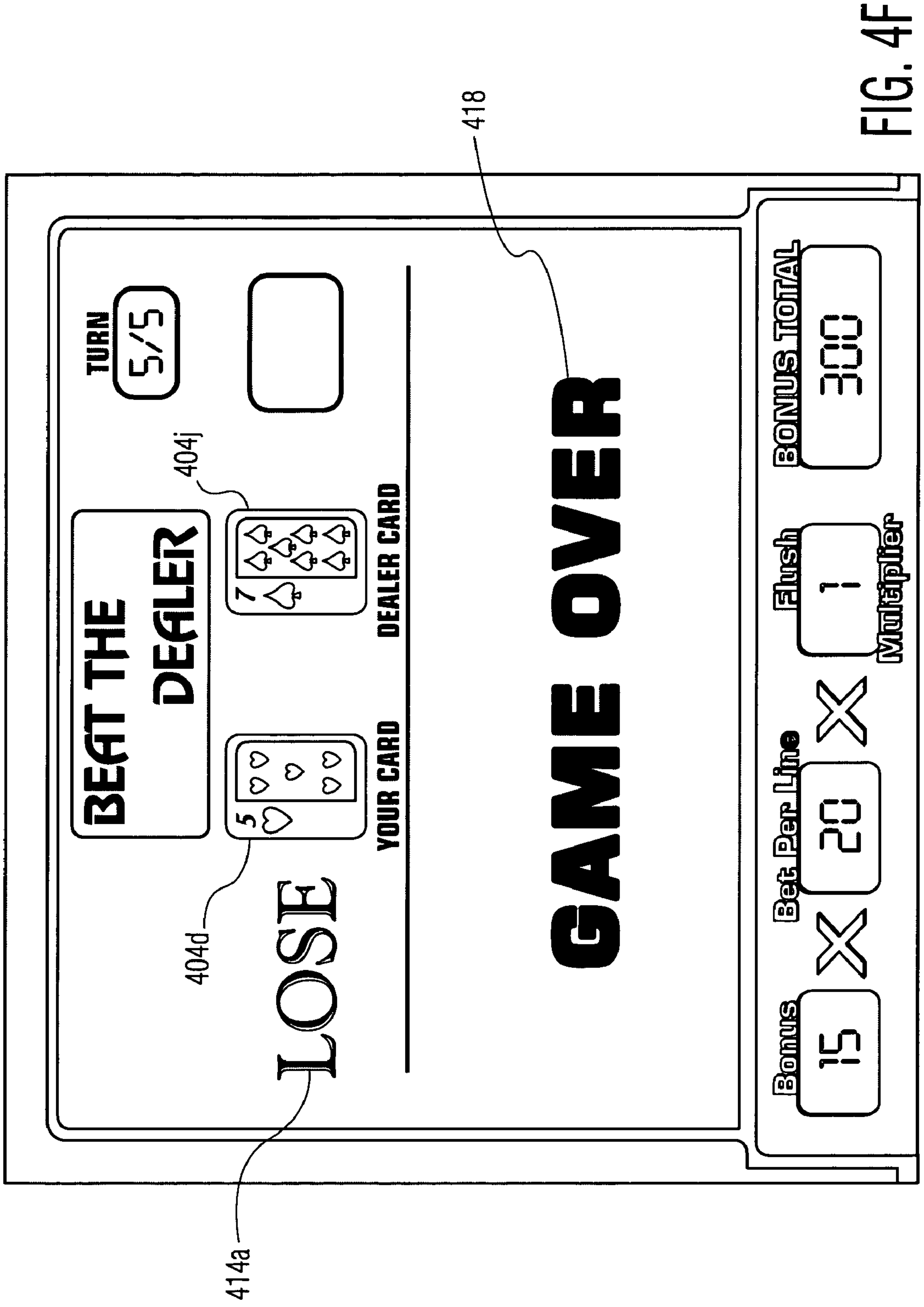

With reference to FIG. 4F, during the fifth turn as indicated by window 412, the player selects face down card 404*j* as the dealer's card by "touching" the card first. The card is then moved to area 410 where it is turned over to reveal a seven of spades. The player then selects face down card 404*d* as the player's card by "touching" this card. The card is then moved to area 408 where it is turned over to reveal a five of hearts. The player's card does not beat the dealer's card and the player loses as indicated by graphic 414*a*. The player is not awarded any bonus credits and the player has 300 bonus credits at the end of the Beat the Dealer game as indicated by window 310*d*. A graphic 418 indicates that the game is over.

Figure 4G:
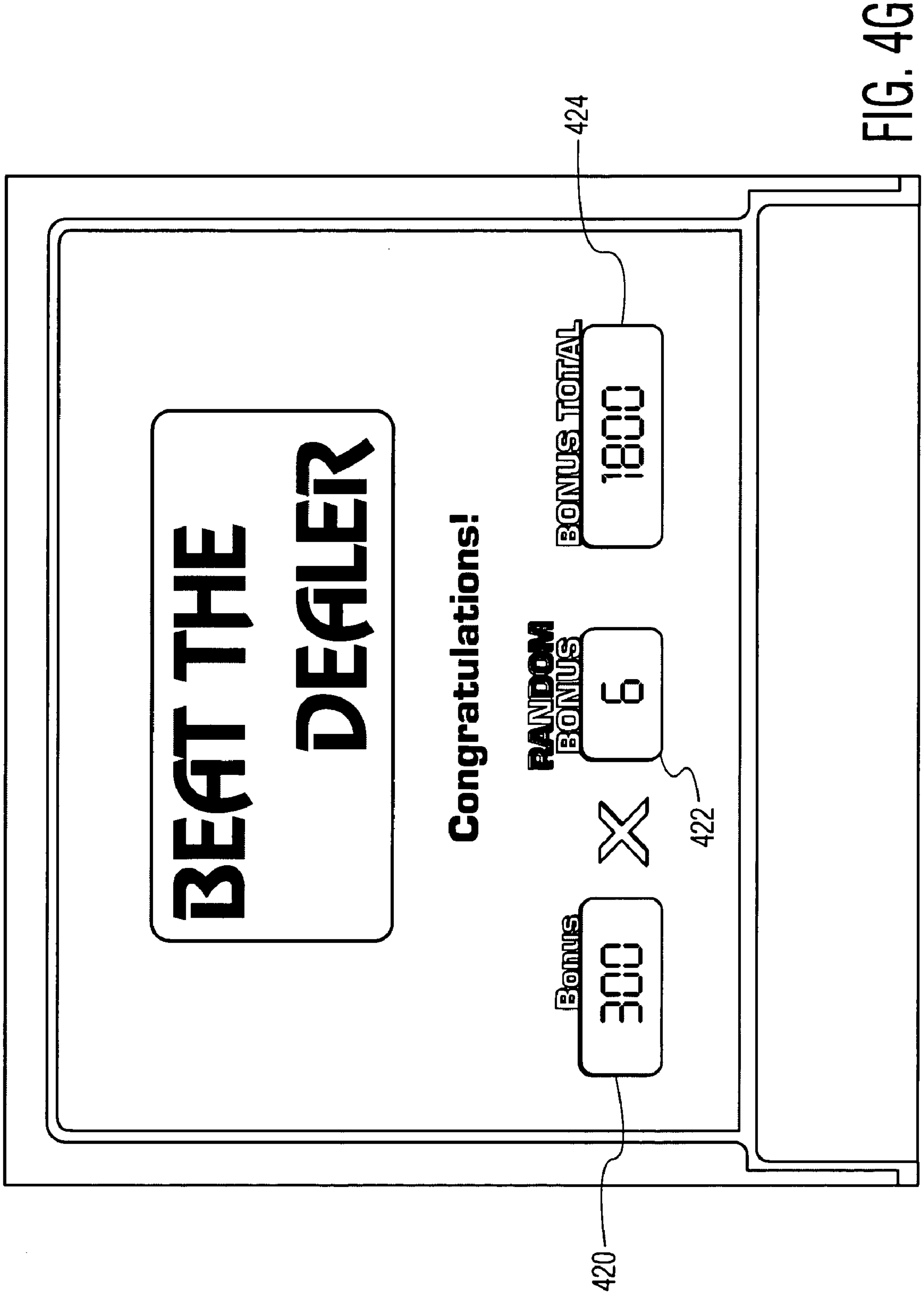

With reference to FIG. 4G, the total bonus credits displayed by window 420 are then multiplied by a random bonus multiplier (in this case six) displayed by window 422. Accordingly, the player is awarded a total of 1800 bonus credits for playing the Beat the Dealer game from start to finish. The total of 1800 bonus credits is displayed by window 424.

Bonus Game: Card Flip Game

Figure 5A:
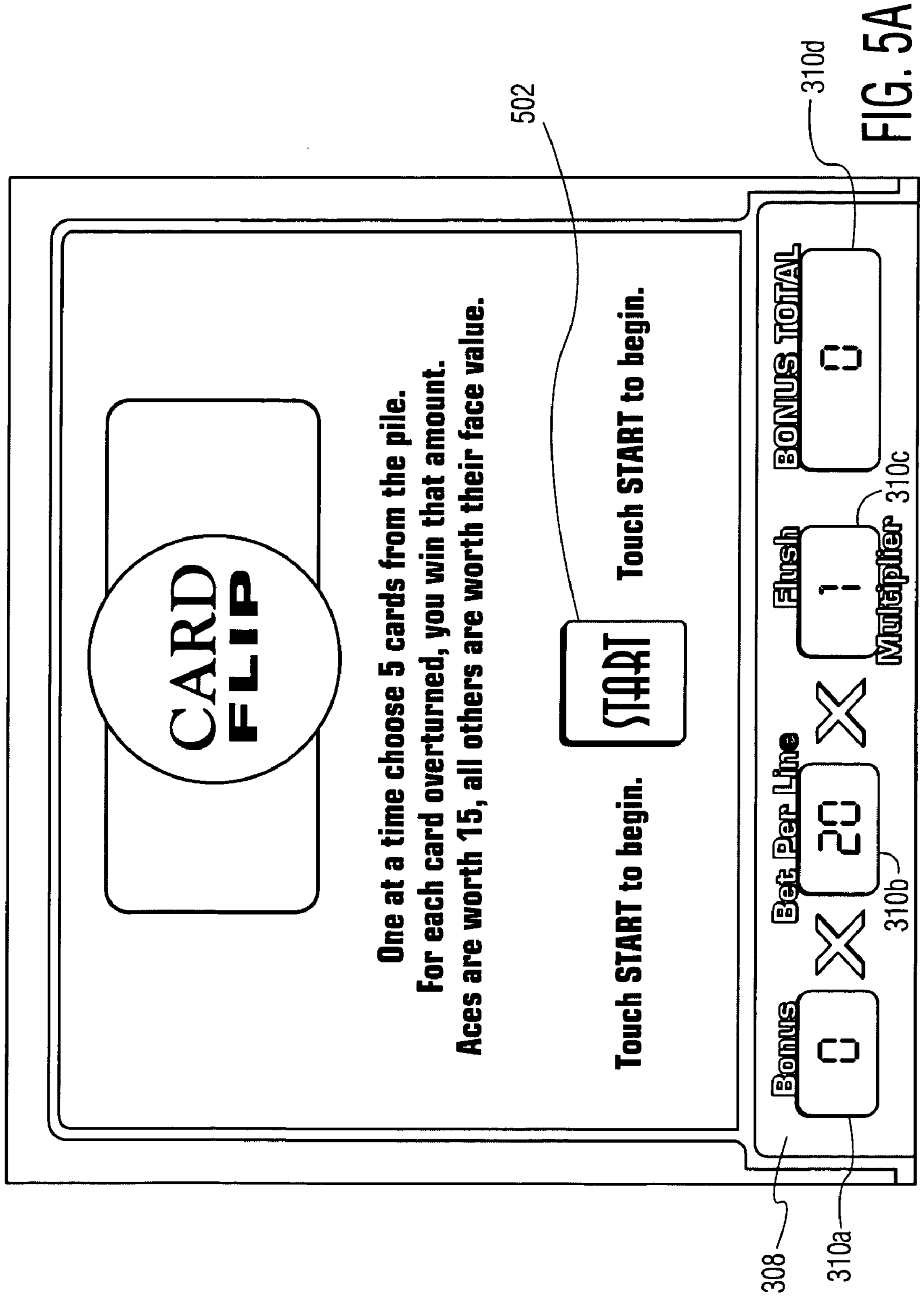
FIGS. 5A–5G progressive screen views showing game play of a Card Flip game of the bonus game of the poker matrix game in accordance with the present disclosure.

If the at least one processor randomly selects the Card Flip game, the graphical user interface 200 displays the graphic shown by FIG. 5A. In the Card Flip game a player starts with 0 credits. The player is dealt 15 cards (face down) from a 36-card deck having numbers ranging from 2 to 10 and the Aces. The player then turns over five cards (one at a time) and is awarded a number of credits equal to the value displayed by the turned over cards. If an ace is uncovered, the player is awarded 15 credits.

After the fifth card is turned over, the player's total credits earned during this game are multiplied by the amount bet per betting line during the spin of the main game which initiated the bonus game times the flush multiplier (if applicable) times the random multiplier. There are no consolation bonus credits awarded for the Card Flip game.

With continued reference to FIG. 5A, a lower portion of the graphical user interface 200 displays the computation indicator 308 for continuously displaying the amount of credits awarded to the player during bonus game play.

As described above with reference to the Hi Lo and Beat the Dealer games, the computation indicator 308 includes four windows 310*a–d*. The values displayed by the first three windows 310-*c* are multiplied and the product is displayed by the fourth window 310*d*. In the Card Flip game, the first window 310*a* indicates zero credits prior to game play. The second window 310*b* indicates the amount bet per betting line for the spin which qualified the player for the bonus game. The third window 310*c* indicates the flush multiplier which is equal to the number of flushes obtained for the spin which qualified the player for the bonus game.

After the START button 502 in FIG. 5A is touched, the graphical user interface 200 displays fifteen cards 504 arranged in three rows and face down. A window 506 is also displayed in the top right corner for indicating the number of cards flipped or turned over.

Figure 5B:
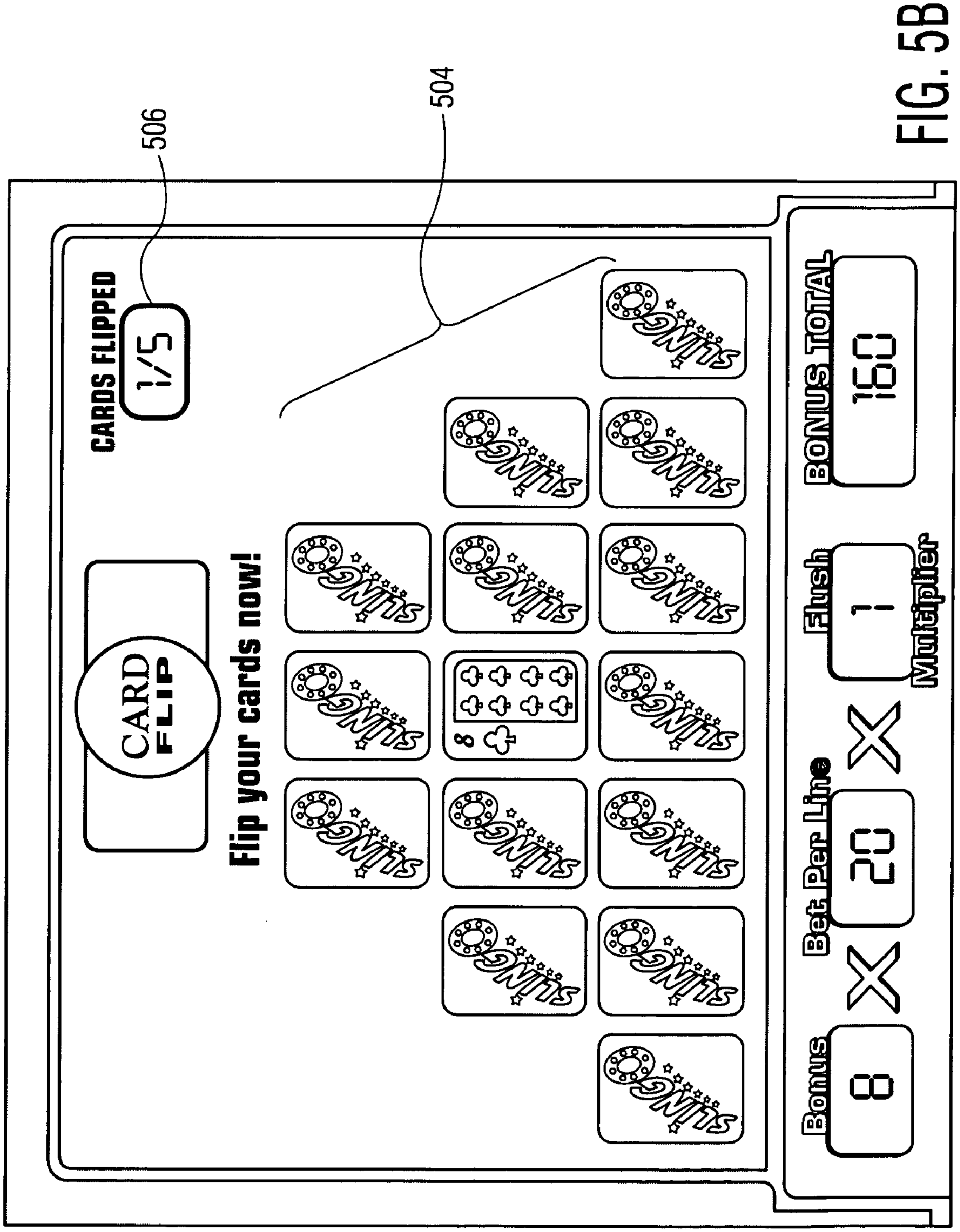

The player then decides to flip over the third card from the left in the middle row. The player touches this card and it is flipped over to reveal an eight of clubs as shown by FIG. 5B. The player is then awarded eight credits as indicated by BONUS window 310*a* to give the player a total of 160 bonus credits as indicated by BONUS TOTAL window 310*d*. The window 506 is also updated to indicate one card flipped over.

Figure 5C:
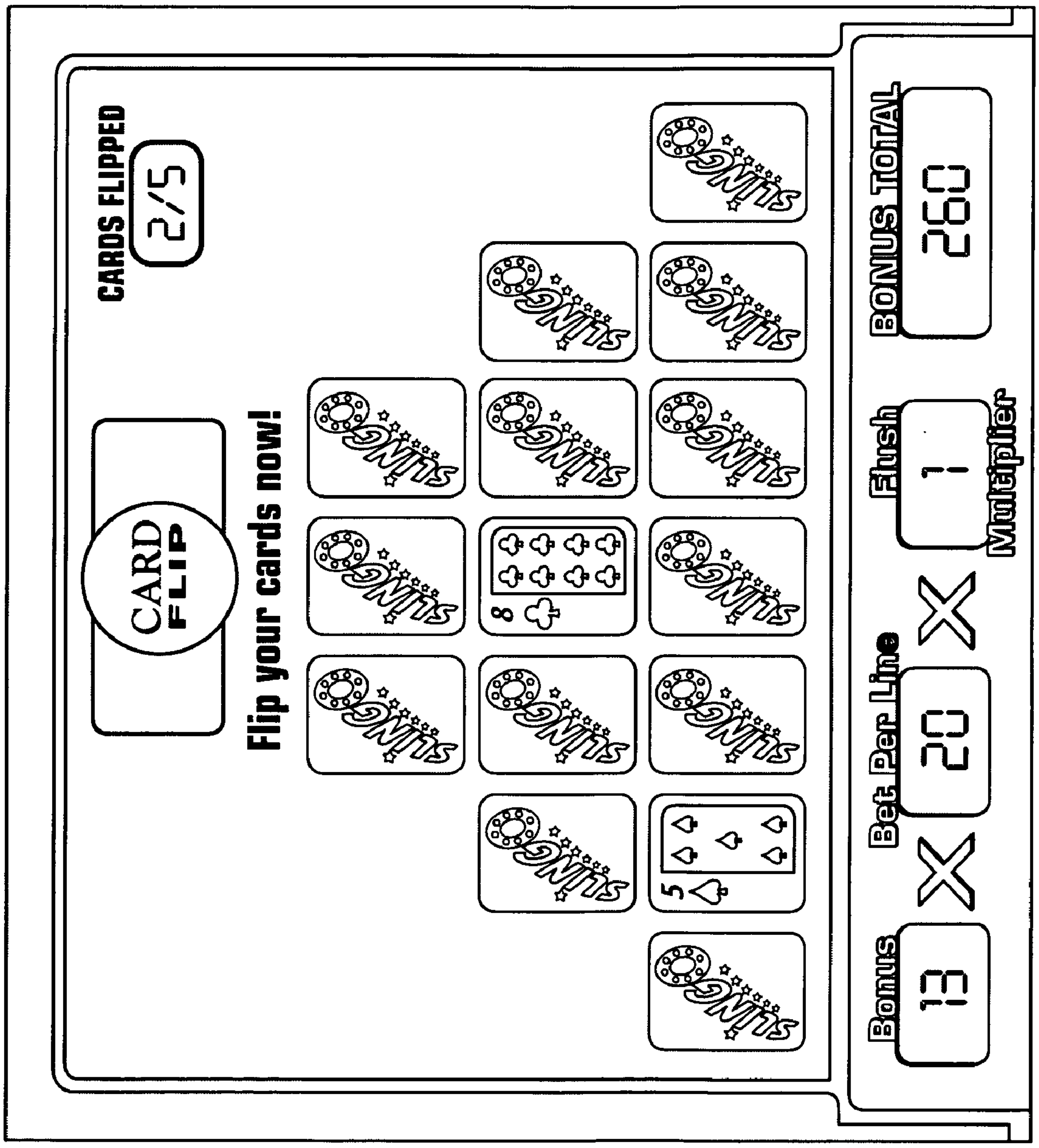

The player then decides to flip over the second card from the left in the bottom row. The player touches this card and it is flipped over to reveal a five of spades as shown by FIG. 5C. The player is then awarded five credits to give him a total of thirteen credits as indicated by BONUS window 310*a* and 260 total bonus credits as indicated by BONUS TOTAL window 310*d*. The window 506 is also updated to indicate two cards flipped over.

Figure 5D:
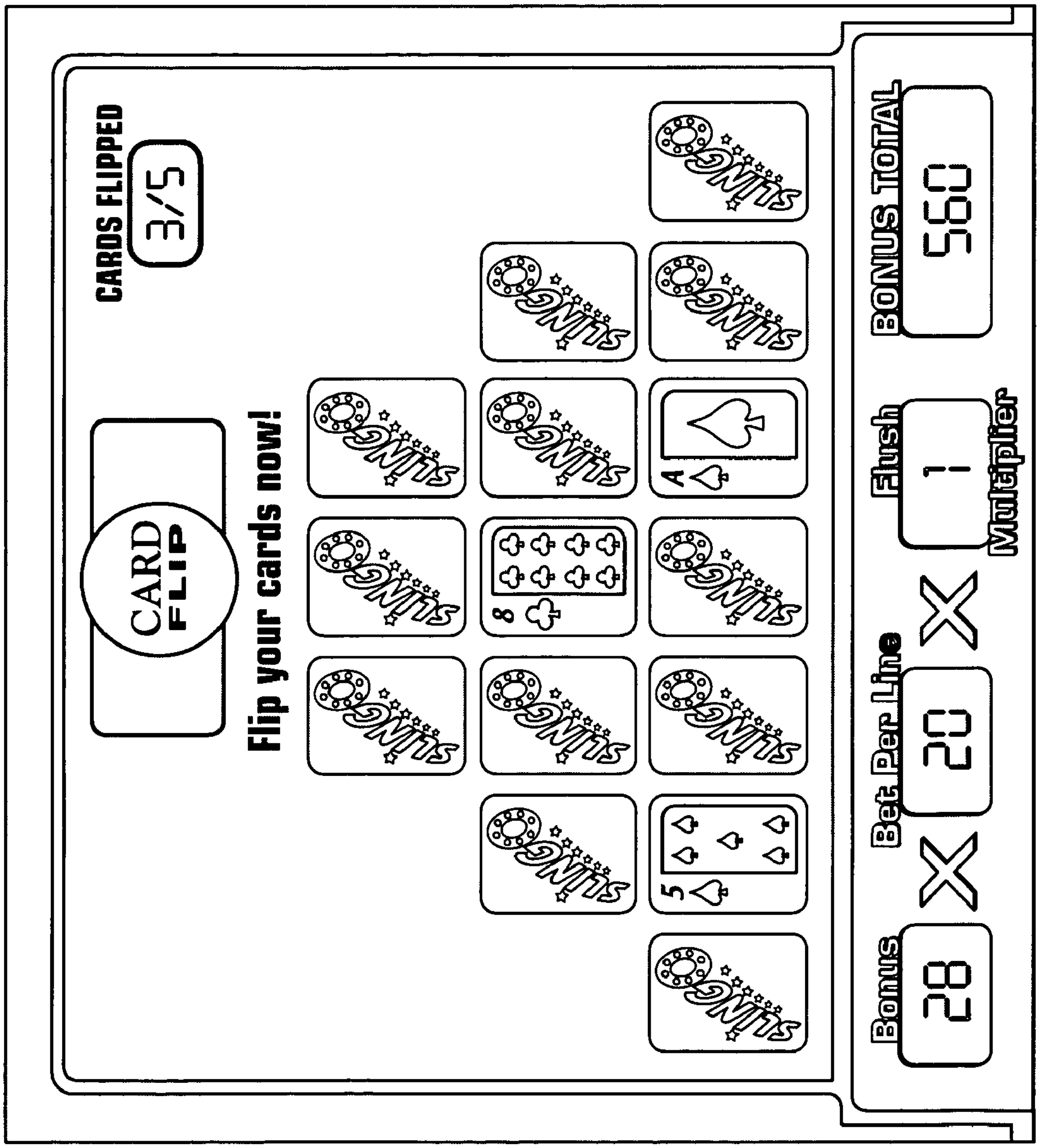

The player then decides to flip over the fifth card from the left in the bottom row. The player touches this card and it is flipped over to reveal an ace of spades as shown by FIG. 5D. The player is then awarded fifteen credits to give him a total of 28 credits as indicated by BONUS window 310*a* and 560 total bonus credits as indicated by BONUS TOTAL window 310*d*. The window 506 is also updated to indicate three cards flipped over.

Figure 5E:
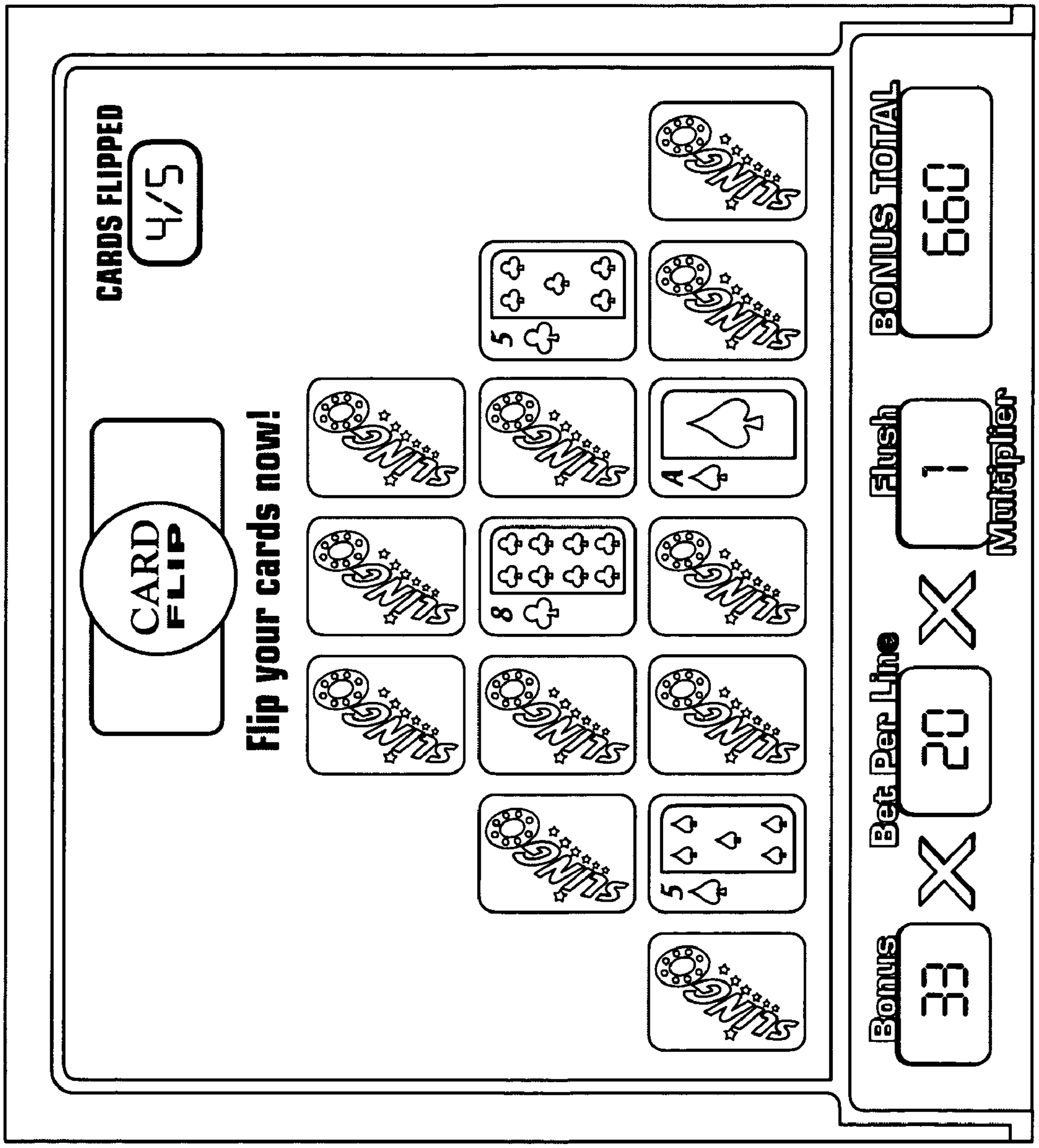

The player then decides to flip over the fifth card from the left in the middle row. The player touches this card and it is flipped over to reveal a five of clubs as shown by FIG. 5E. The player is then awarded five credits to give him a total of 33 credits as indicated by BONUS window 310*a* and 660 total bonus credits as indicated by BONUS TOTAL window 310*d*. The window 506 is also updated to indicate four cards flipped over.

Figure 5F:
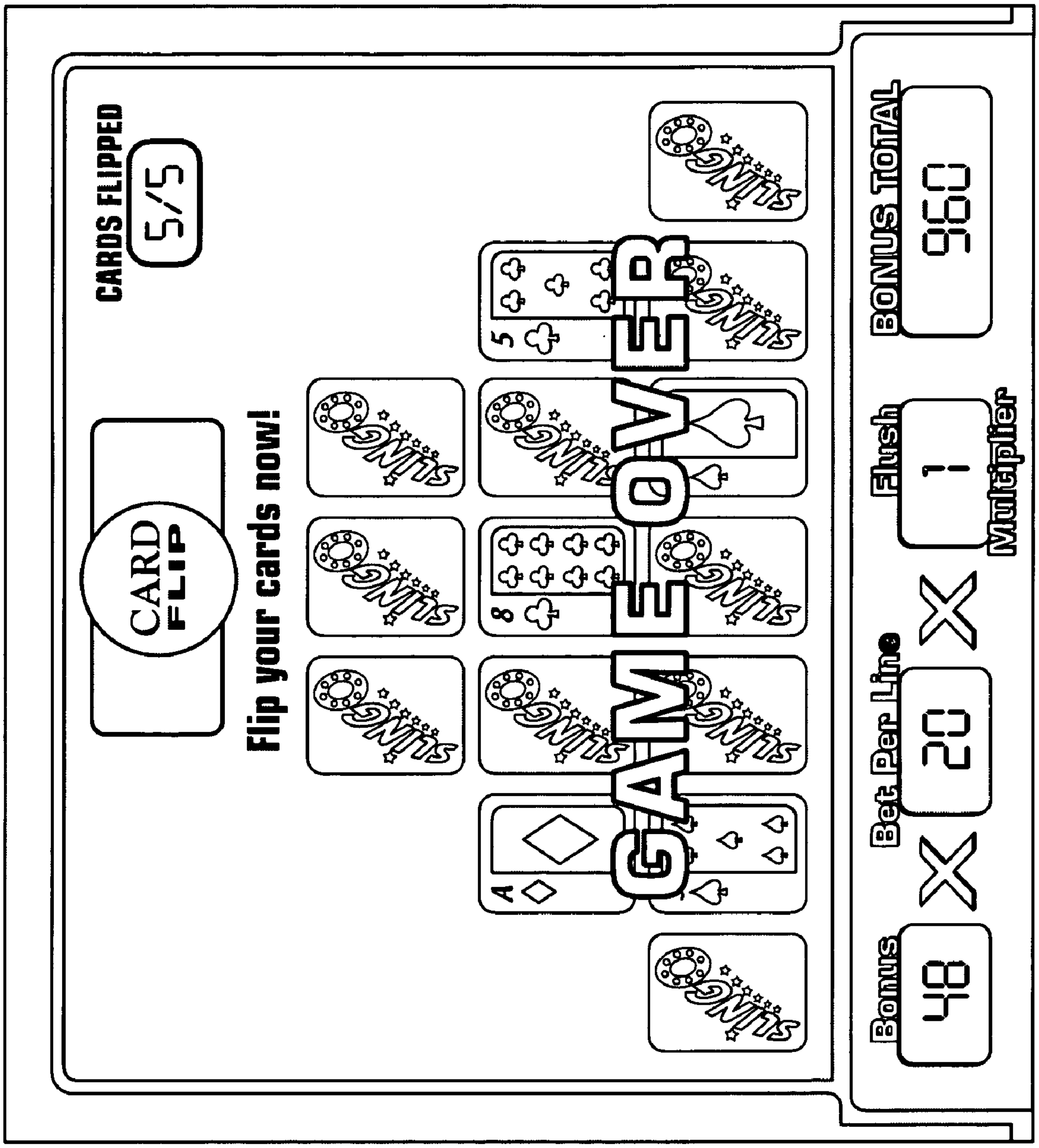

The player then decides to flip over the first card from the left in the middle row. The player touches this card and it is flipped over to reveal an ace of diamonds as shown by FIG. 5F. The player is then awarded fifteen credits to give him a total of 48 credits as indicated by BONUS window 310*a* and 960 total bonus credits as indicated by BONUS TOTAL window 310*d*. The window 506 is also updated to indicate five cards flipped over.

Figure 5G:
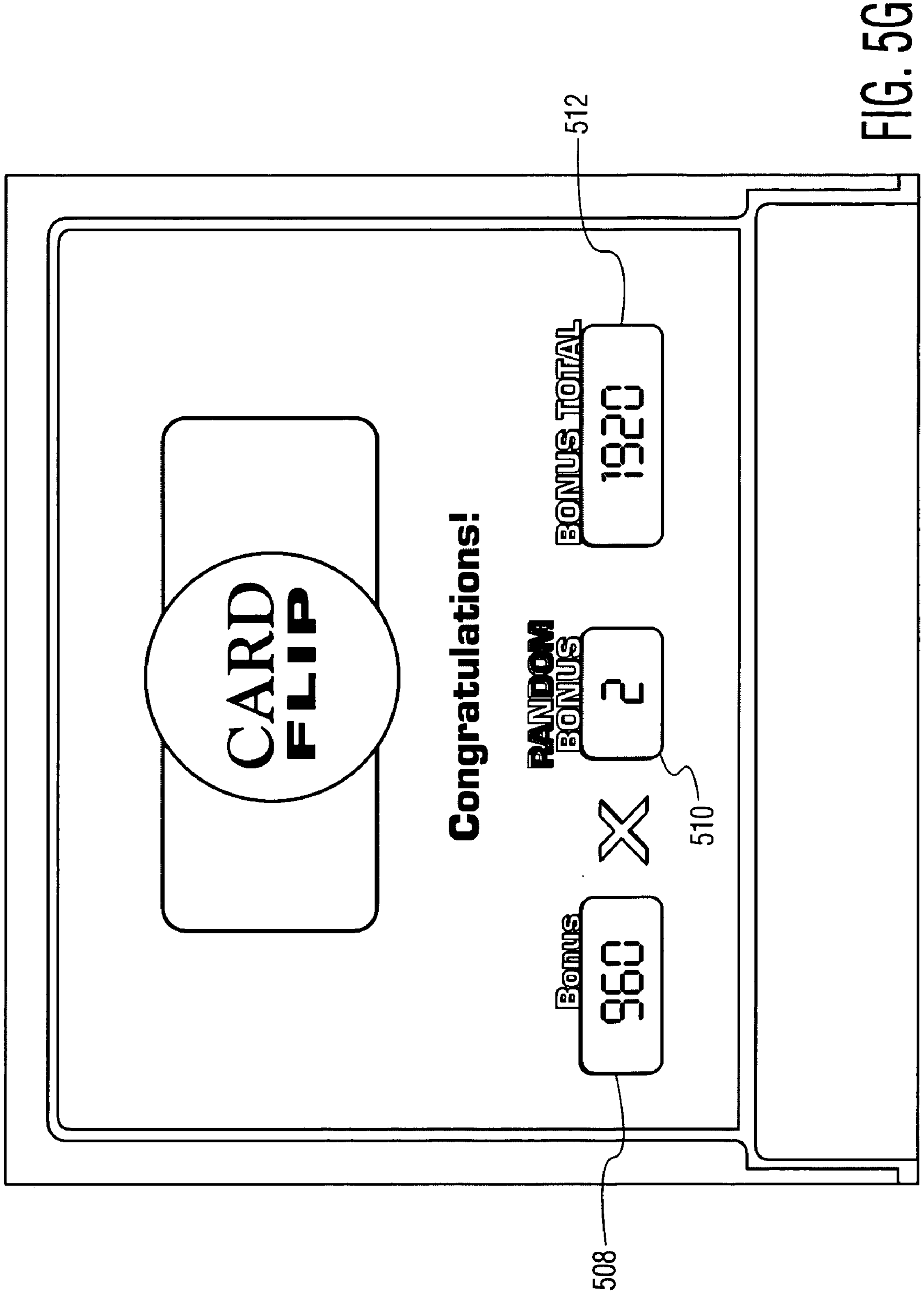

With reference to FIG. 5G, the total bonus credits displayed by window 508 are then multiplied by a random bonus multiplier (in this case two) displayed by window 510. Accordingly, the player is awarded a total of 1920 bonus credits for playing the Card Flip game from start to finish. The total of 1920 bonus credits is displayed by window 512.

Lottery Card

Figure 6A:
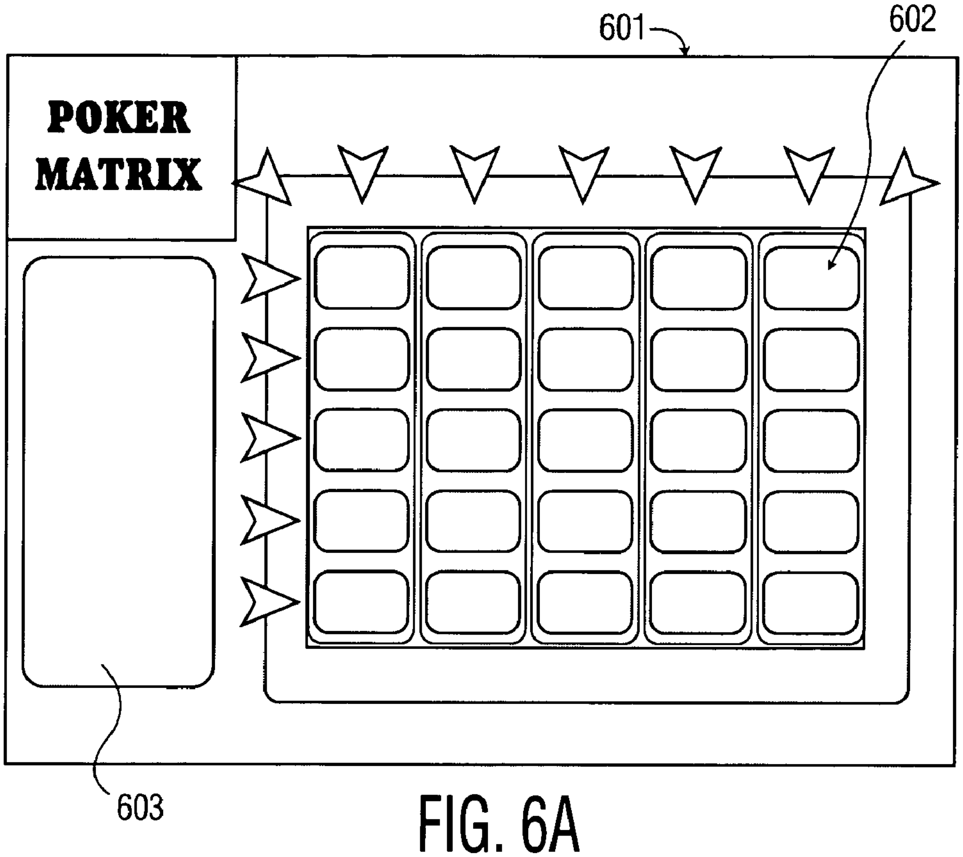
FIGS. 6A and 6B illustrate a lottery card embodiment for playing a version of the main game of the poker matrix game in accordance with the present disclosure.
Figure 6B:
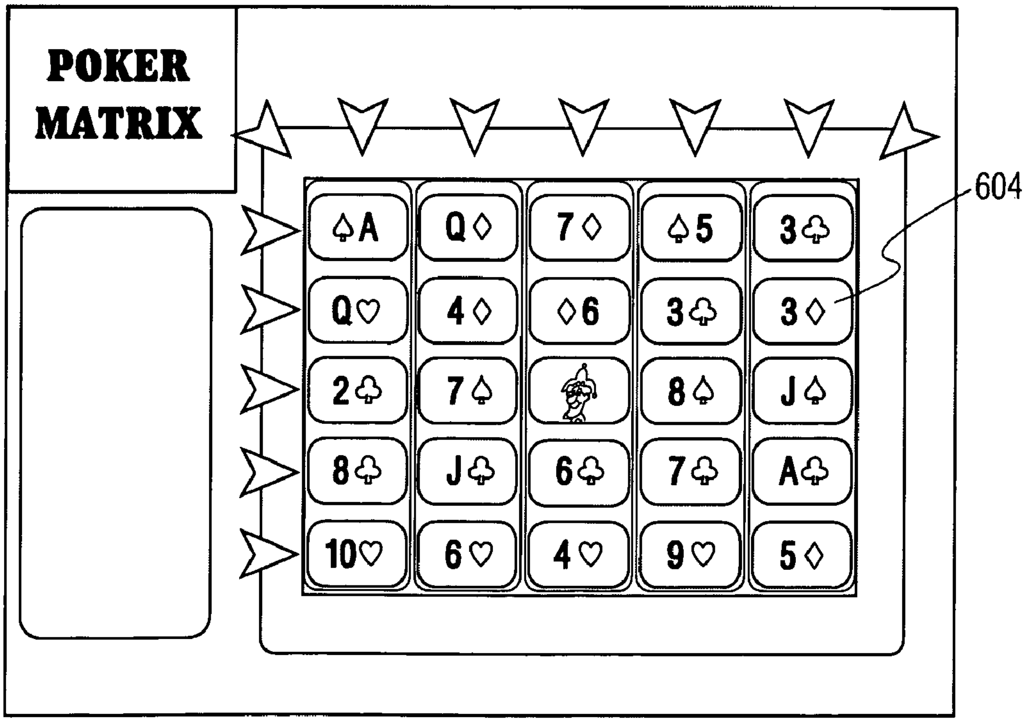

Another embodiment of the present disclosure is a lottery card as shown in FIG. 6A and FIG. 6B. The exemplary lottery card 601 is of the “Scratch-‘n’-Win” type lottery games offered by many states. The lottery card 601 has a number of scratch cells 602, which cover cards 604. The lottery card embodiment is played by scratching of the scratch cells 602 to reveal the underlying cards 604. As in the previously described embodiments, winning conditions include the occurrence of revealing a predetermined minimum number of winning poker hands in a given row. This embodiment differs from the previous embodiment in that a player cannot choose which lines to play, instead all lines are played. The payouts may be based on whether a winning poker hand occurred in a horizontal, vertical or diagonal line. More than one winning poker hand may occur on the lottery card 601, in which case, payout would equal the total from all the winning conditions obtained. Choices may be provided to the player upon purchase of the lottery card 601, such as betting line selection, difficulty level, etc. The various payout conditions and game rules are printed in the rules area 603.

In an alternate embodiment of the lottery card 601, the player elects which lines (vertical, horizontal, diagonal and all lines) that he desires to base his winning or loss status at the time of purchase. In this embodiment, another set of four cells are provided alongside, above or below the grid. Each of the four cells corresponds to the lines the player desires to base his winning or loss status. The card 601 is then presented to the player for scratching off and revealing the cells of the grid. If one or more of the selected lines have a predetermined minimum number wining poker hands, then the player can present the lottery card and be paid his winnings.

It is contemplated that the cost of the lottery card 601 is more if the player desires to base his winning or loss status on all the lines of the grid than if the player desires to base his winning or loss status on the vertical and horizontal lines. The cost of the lottery card 601 is the least if the player desires to base his winning or loss status on the diagonal lines of the grid.

It will be understood that various modifications and changes in form and detail may be made to the embodiments of the present disclosure without departing from the spirit and scope of the present disclosure. Therefore, the above description should not be construed as limiting the invention but merely as exemplifications of embodiments thereof. Those skilled in the art will envision other modifications within the scope of the present disclosure as defined by the claims appended hereto. Having thus described the invention with the details and particularity required by the patent laws, what is claimed and desired protected is set forth in the appended claims.

What is claimed is:

1. A method for playing a game, said method comprising:

accepting a selection from a player of at least one betting line of a plurality of betting lines defined by a matrix;

dealing cards so that the plurality of betting lines have n cards each, where n is an integer;

determining whether a first event occurred, wherein the first event is whether at least one wild card is at least one of the dealt cards in the at least one selected betting line, and if yes, replacing each of said at least one wild card with another card, where said at least one wild card is selected from the group consisting of a first wild card corresponding to only a single multiplier, wherein the single multiplier is a non-user determined first multiplier and a second wild card corresponding to only a single multiplier, wherein the single multiplier is a non-user determined second multiplier greater than the non-user determined first multiplier; and determining whether a second event occurred, wherein the second event is whether a winning poker hand is displayed on the at least one selected betting line, and if yes, calculating a score using none of the non-user determined first and second multipliers if the first event did not occur, wherein at least one wild card was not one of the dealt cards to the at least one selected betting line, and calculating the score using one of the corresponding non-user determined predetermined first or second multiplier if the first and second events occurred, wherein at least one wild card was dealt to the at least one selected betting line and a winning poker hand is displayed by the at least one selected betting line.

2. The method as recited in claim 1, further comprising the step of determining whether a free spin card is one of the dealt cards, and if yes, repeating said dealing step and determining steps.

3. The method as recited in claim 1, further comprising the step of calculating the score only if the winning poker hand is displayed by the at least one selected betting line.

4. The method as recited in claim 1, wherein the multiplier is said first or second multiplier if said winning poker hand includes said first or second wild card, respectively, and the multiplier is a third multiplier greater than the first and second multiplier if said winning poker hand includes said first and second wild cards.

5. The method as recited in claim 3, wherein the step of calculating comprises referring to a scoring table correlating each of a plurality of poker hand combinations with a respective number of credits.

6. The method as recited in claim 5, wherein the step of calculating further comprises multiplying the number of credits corresponding to the winning poker hand according to the scoring table by an amount of credits bet by said player for the at least one selected betting line.

7. The method as recited in claim 1, wherein said plurality of betting lines are selected from the group consisting of horizontal lines equal to the number of rows of the matrix, vertical lines equal to the number of columns of the matrix, and two diagonal lines of the matrix.

8. The method as recited in claim 1, further comprising the step of determining whether the at least one selected betting line is dealt a predetermined set of cards.

9. The method as recited in claim 8, wherein if yes, initiating a bonus game comprising:

requesting said player to select a game to play;

wherein if a first game is selected, said player guesses whether a face down card has a greater or lesser value than a face up card, wherein said player is awarded credits for a correct guess;

wherein if a second game is selected, said player selects a dealer’s card and a player’s card from a plurality of face down cards, wherein said player is awarded credits if said player’s card has a greater value than said dealer’s card;

wherein if a third game is selected, said player selects at least one card from a plurality of face down cards, wherein said player is awarded credits equal to the value of the at least one selected card.

10. A gaming system for playing a game, said system comprising:

means for accepting a selection from a player of at least one betting line of a plurality of betting lines defined by a matrix;

means for dealing cards so that the plurality of betting lines have n cards each, where n is an integer;

means for determining whether a first event occurred, wherein the first event is whether at least one wild card is at least one of the dealt cards in the at least one selected betting line, and if yes, replacing each of said at least one wild card with another card, where said at least one wild card is selected from the group consisting of a first wild card corresponding to only a single multiplier, wherein the single multiplier is a non-user determined first multiplier and a second wild card corresponding to only a single multiplier, wherein the single multiplier is a non-user determined second multiplier greater than the non-user determined first multiplier; and means for determining whether a second event occurred, wherein the second event is whether a winning poker hand is displayed on the at least one selected betting line and if yes, calculating a score using none of the non-user determined first and second multipliers if the first event did not occur, wherein at least one wild card was not one of the dealt cards to the at least one selected betting line, and calculating the score using one of the corresponding non-user determined predetermined first or second multiplier if the first and second events occurred, wherein at least one wild card was dealt to the at least one selected betting line and a winning poker hand is displayed by the at least one selected betting line.

11. The system as recited in claim 10, further comprising means for calculating a score based on whether a winning poker hand is displayed by the at least one selected betting line.

12. The system as recited in claim 11, wherein the second means for determining comprises means for referring to a scoring table correlating each of a plurality of poker hand combinations with a respective number of credits.

13. The system as recited in claim 12, wherein the second means for determining comprises means for multiplying the number of credits corresponding to the winning poker hand according to the scoring table by an amount of credits bet by said player for the at least one selected betting line.

14. The system as recited in claim 11, further comprising means for displaying icons each corresponding to a game, wherein selection by said player of a displayed icon enables play of said corresponding game:

wherein if a first icon of said displayed icons is selected, said player guesses whether a face down card has a greater or lesser value than a face up card, wherein said player is awarded credits for a correct guess;

wherein if a second icon of said displayed icons is selected, said player selects a dealer's card and a player's card from a plurality of face down cards, wherein said player is awarded credits if said player's card has a greater value than said dealer's card;

wherein if a third icon of said displayed icons is selected, said player selects at least one card from a plurality of face down cards, wherein said player is awarded credits equal to the value of the at least one selected card.

15. The system as recited in claim 10, wherein the multiplier is said first or second multiplier if said winning poker hand includes said first or second wild card, respectively, and the multiplier is a third multiplier greater than the first and second multiplier if said winning poker hand includes said first and second wild cards.

16. The system as recited in claim 10, wherein said plurality of betting lines are selected from the group consisting of horizontal lines equal to the number of rows of the matrix, vertical lines equal to the number of columns of the matrix, and two diagonal lines of the matrix.

17. The system as recited in claim 10, further comprising means for determining whether the at least one selected betting line is dealt a predetermined set of cards.

18. A computer readable medium comprising a set of computer readable instructions capable of being executed by at least one processor for playing a game comprising:

accepting a selection from a player of at least one betting line of a plurality of betting lines defined by a matrix;

dealing cards so that the plurality of betting lines have n cards each, where n is an integer;

determining whether a first event occurred, wherein the first event is whether at least one wild card is at least one of the dealt cards in the at least one selected betting line, and if yes, replacing each of said at least one wild card with another card, where said at least one wild card is selected from the group consisting of a first wild card corresponding to only a single multiplier, wherein the single multiplier is a non-user determined first multiplier and a second wild card corresponding to only a single multiplier, wherein the single multiplier is a non-user determined second multiplier greater than the non-user determined first multiplier; and determining whether a second event occurred, wherein the second event is whether a winning poker hand is displayed on the at least one selected betting line, and if yes, calculating a score using none of the non-user determined first and second multipliers if the first event did not occur, wherein at least one wild card was not one of the dealt cards to the at least one selected betting line, and calculating the score using one of the corresponding non-user determined predetermined first or second multiplier if the first and second events occurred, wherein at least one wild card was dealt to the at least one selected betting line and a winning poker hand is displayed by the at least one selected betting line.

19. The computer readable medium as recited in claim 18, wherein the multiplier is said first or second multiplier if said winning poker hand includes said first or second wild card, respectively, and the multiplier is a third multiplier greater than the first and second multiplier if said winning poker hand includes said first and second wild cards.

20. The computer readable medium as recited in claim 18, wherein the game further comprises the step of determining whether the at least one selected betting line is dealt a predetermined set of cards, and if yes, initiating a bonus game comprising:

requesting said player to select a game to play;

wherein if a first game is selected, said player guesses whether a face down card has a greater or lesser value than a face up card, wherein said player is awarded credits for a correct guess;

wherein if a second game is selected, said player selects a dealer's card and a player's card from a plurality of face down cards, wherein said player is awarded credits if said player's card has a greater value than said dealer's card;

wherein if a third game is selected, said player selects at least one card from a plurality of face down cards, wherein said player is awarded credits equal to the value of the at least one selected card.

* * * * *